(12) United States Patent
Rapaka et al.

(10) Patent No.: US 9,591,324 B2
(45) Date of Patent: Mar. 7, 2017

(54) SYSTEMS AND METHODS FOR SEPARATELY DEFINING DEPENDENCIES FOR SUB-LAYER BASED INTER-LAYER PREDICTION

(71) Applicant: QUALCOMM Incorporated, San Diego, CA (US)

(72) Inventors: Krishnakanth Rapaka, San Diego, CA (US); Ye-Kui Wang, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 14/513,113

(22) Filed: Oct. 13, 2014

(65) Prior Publication Data

US 2015/0103905 A1    Apr. 16, 2015

Related U.S. Application Data

(60) Provisional application No. 61/890,864, filed on Oct. 14, 2013.

(51) Int. Cl.
*H04N 19/503* (2014.01)
*H04N 19/30* (2014.01)
(Continued)

(52) U.S. Cl.
CPC ........... *H04N 19/503* (2014.11); *H04N 19/30* (2014.11); *H04N 19/44* (2014.11); *H04N 19/51* (2014.11);
(Continued)

(58) Field of Classification Search
CPC ...... H04N 19/503; H04N 19/30; H04N 19/44; H04N 19/51; H04N 19/61; H04N 19/70; H04N 19/91
(Continued)

(56) References Cited

U.S. PATENT DOCUMENTS

2008/0089597 A1* 4/2008 Guo ................. H04N 19/30
382/238
2015/0365686 A1* 12/2015 Kang ................. H04N 19/70
375/240.02

(Continued)

OTHER PUBLICATIONS

Hendry, et al., "AHG 9: Inter-layer Prediction Indication at Picture Level", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu/int/av-arch/jctvc-site/,, No. JCTVC-M0129, Apr. 8, 2013 (Apr. 8, 2013), XP030114086, pp. 1-6.

(Continued)

*Primary Examiner* — William C Vaughn, Jr.
*Assistant Examiner* — Jae N Noh
(74) *Attorney, Agent, or Firm* — Knobbe Martens Olson & Bear LLP

(57) ABSTRACT

Systems and methods for separately defining and indicating inter-layer prediction dependencies for a first layer with respect to each of a number of enhancement layers associated with the first layer are described herein. One aspect of the subject matter described in the disclosure provides a video encoder comprising a memory unit configured to store a first picture associated with a first layer and enhancement layer pictures associated with a plurality of enhancement layers. The video encoder further comprises a processor in communication with the memory unit. The processor is configured to provide a separate indication for each of the enhancement layers that indicates whether the first picture (Continued)

Scenario A

Scenario B can be used for inter-layer prediction of the enhancement layer picture in a respective enhancement layer.

15 Claims, 8 Drawing Sheets

(51) Int. Cl.
*H04N 19/44* (2014.01)
*H04N 19/51* (2014.01)
*H04N 19/91* (2014.01)
*H04N 19/61* (2014.01)
*H04N 19/70* (2014.01)

(52) U.S. Cl.
CPC ............. *H04N 19/61* (2014.11); *H04N 19/70* (2014.11); *H04N 19/91* (2014.11)

(58) Field of Classification Search
USPC ..................................................... 375/240.12
See application file for complete search history.

(56) References Cited

U.S. PATENT DOCUMENTS

| | | | |
|---|---|---|---|
| 2016/0119632 A1* | 4/2016 | Lee ........................ | H04N 19/31 375/240.12 |
| 2016/0316210 A1* | 10/2016 | Lee ........................ | H04N 19/30 |

OTHER PUBLICATIONS

Hendry, et al., "AHG 9: Signalling Inter-layer Prediction Indication", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0203, Apr. 8, 2013 (Apr. 8, 2013), XP030114160, pp. 1-3.

International Search Report and Written Opinion—PCT/US2014/060453—ISA/EPO—Jan. 22, 2015.

Lee H., et al., "MV-HEVC/SHVC HLS: Signalling for Inter-layer prediction indication", 5. JCT-3V Meeting; Jul. 27, 2013-Aug. 2, 2013- Feb. 8, 2013; Vienna; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0091-v3, Jul. 26, 2013 (Jul. 26, 2013), XP030131097, pp. 1-4.

Rapaka K., et al., "MV-HEVC/SHVC HLS: On inter-layer RPS derivation and sub-layer inter-layer dependency", 6. JCT-3V Meeting; Oct. 25, 2013- Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0080, Oct. 15, 2013 (Oct. 15, 2013), XP030131488, pp. 1-6.

\* cited by examiner

SYSTEMS AND METHODS FOR SEPARATELY DEFINING DEPENDENCIES FOR SUB-LAYER BASED INTER-LAYER PREDICTION

CROSS-REFERENCE TO RELATED APPLICATIONS

This application claims priority to U.S. Provisional Patent Application No. 61/890,864, entitled "FLEXIBLE SUB-LAYER BASED INTER-LAYER PREDICTION DEPENDENCY IN HEVC EXTENSIONS" and filed on Oct. 14, 2013, the entirety of which is incorporated herein by reference.

TECHNICAL FIELD

This disclosure is related to the field of scalable video coding (SVC). More particularly, it is related to HEVC based SVC (HEVC-SVC) and HEVC extensions.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in various video coding standards as described below (e.g., High Efficiency Video Coding (HEVC)). The video devices may transmit, receive, encode, decode, and/or store digital video information more efficiently by implementing such video compression techniques.

SUMMARY

It would be beneficial to permit a video encoder to provide separate, independent indications of inter-layer prediction dependency between a first layer and each of a number of enhancement layers associated with the first layer. Such separate, independent indications may improve coding performance (e.g., provide resource trade-off flexibilities) in a number of coding scenarios, e.g., in real-time application scenarios.

Therefore, techniques for separately defining and indicating inter-layer prediction dependencies for a first layer with respect to each of a number of enhancement layers associated with the first layer using indications and/or determinations related to certain properties of the pictures in the first layer and/or the pictures in the associated enhancement layer are described herein. For example, the present disclosure describes techniques for defining, indicating, and/or determining whether pictures in the first layer can be used for inter-layer prediction of a first enhancement layer while separately defining, indicating, and/or determining whether pictures in the first layer can be used for inter-layer prediction of a second enhancement layer. Advantages of the techniques described in the present disclosure, among other advantages, may include reducing memory allocation during inter-layer prediction and allowing resource trade-off flexibility in certain coding scenarios, such as implementing lightweight decoding (e.g., single-loop decoding) for one layer while implementing high-quality decoding (e.g., multi-loop decoding) for another layer.

The systems, methods, and devices of this disclosure each have several innovative aspects, no single one of which is solely responsible for the desirable attributes disclosed herein. The details of one or more examples are set forth in the accompanying drawings and the description below. Other features, objects, and advantages will be apparent from the description and drawings, and from the claims.

One aspect of the subject matter described in the disclosure provides a video encoder comprising a memory unit configured to store a first picture associated with a first layer and enhancement layer pictures associated with a plurality of enhancement layers. The video encoder further comprises a processor in communication with the memory unit. The processor is configured to provide a separate indication for each of the enhancement layers that indicates whether the first picture can be used for inter-layer prediction of the enhancement layer picture in a respective enhancement layer.

Another aspect of the subject matter described in the disclosure provides a method of encoding video. The method comprises storing a first picture associated with a first layer and enhancement layer pictures associated with a plurality of enhancement layers. The method further comprises providing a separate indication for each of the enhancement layers that indicates whether the first picture can be used for inter-layer prediction of the enhancement layer picture in a respective enhancement layer.

Another aspect of the subject matter described in the disclosure provides a video decoder comprising a memory unit. The memory unit is configured to store a first picture associated with a first layer and enhancement pictures associated with a plurality of enhancement layers. The video decoder further comprises a processor in communication with the memory unit. The processor is configured to separately determine for each of the enhancement layers, based on a respective indication, whether the first picture can be used for inter-layer prediction of the enhancement layer picture in a respective enhancement layer.

Another aspect of the subject matter described in the disclosure provides a method for decoding video. The method comprises storing a first picture associated with a first layer and enhancement layer pictures associated with a plurality of enhancement layers. The method further comprises separately determining for each of the enhancement layers, based on a respective indication, whether the first picture can be used for inter-layer prediction of an enhancement layer picture in a respective enhancement layer.

DETAILED DESCRIPTION

Figure 1A:
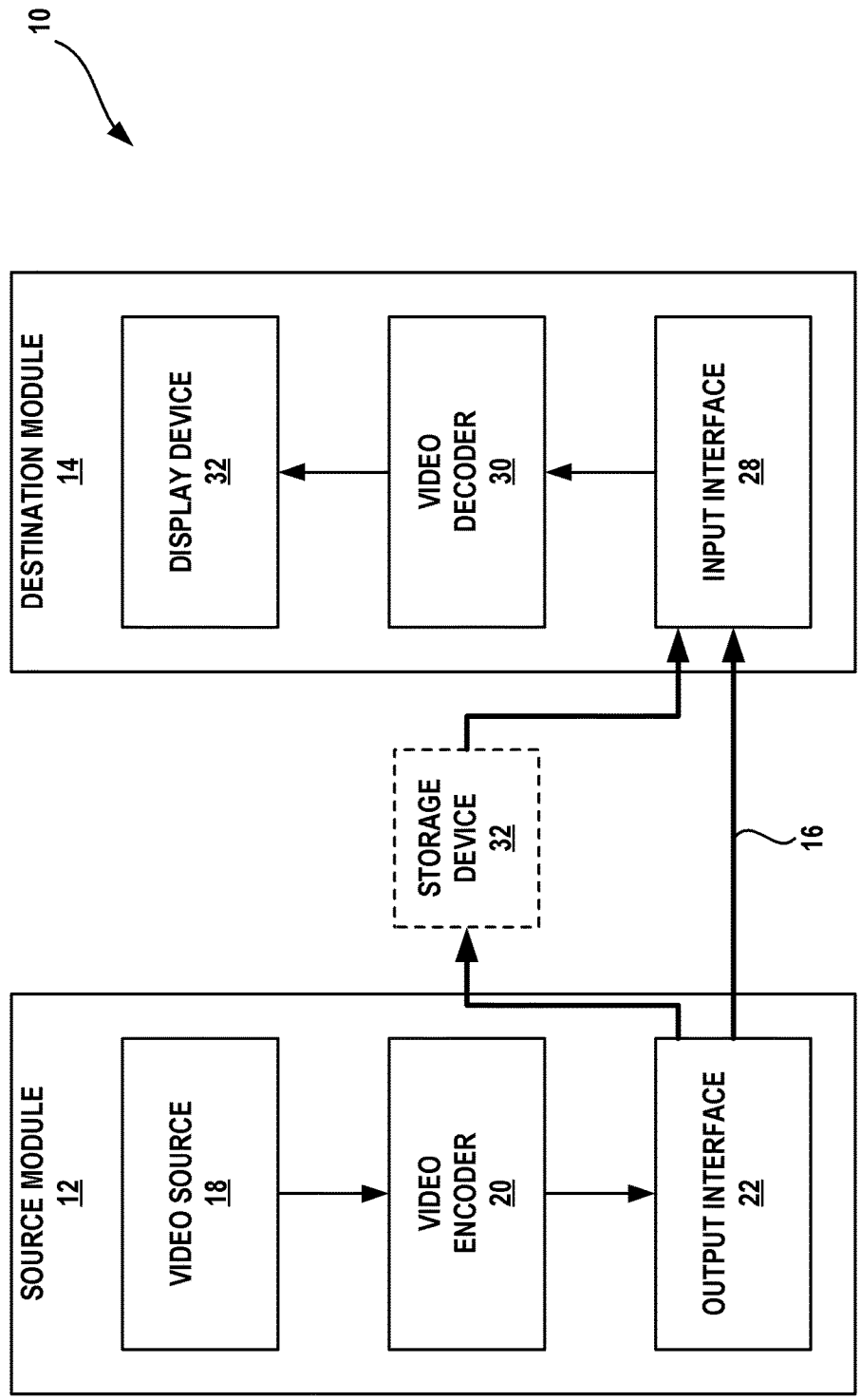
FIG. 1A is a block diagram illustrating an example video encoding and decoding system that may utilize the separate inter-layer prediction dependency definition techniques described in this disclosure.

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Video coding standards include those defined by ITU-T H.261, ISO/IEC MPEG-1 Visual, ITU-T H.262 or ISO/IEC MPEG-2 Visual, ISO/IEC MPEG-4 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions, and Part 10, Advanced Video Coding (AVC), the High Efficiency Video Coding (HEVC) standard presently under development, and extensions of such standards. HEVC has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification ("HEVC WD") is available from http://phenix.int-evry.fr/jct/doc_end_user/documents/14_Vienna/wg11/JCTVC-N1003-v1.zip. The multi-view extension to HEVC (MV-HEVC) and an advanced HEVC 3D video coding extension (3D-HEVC) are being developed by the JCT-3V. Furthermore, the scalable video coding extension to HEVC (SHVC) is being developed by the JCT-VC. A recent Working Draft of MV-HEVC ("MV-HEVC WD5") is available from http://phenix.it-sudparis.eu/jct2/doc_end_user/documents/5_Vienna/wg11/JCT3V-E1004-v6.zip. The latest Working Draft of 3D-HEVC ("3D-HEVC WD1") is available from http://phenix.it-sudparis.eu/jct2/doc_end_user/documents/5_Vienna/wg11/JCT3V-E1001-v3.zip. Further, a recent Working Draft of SHVC ("SHVC WD3") is available from http://phenix.it-sudparis.eu/jct/doc_end_user/documents/14_Vienna/wg11/JCTVC-N1008-v3.zip.

As described above, certain aspects of video coding include defining whether pictures in a first layer may be used for inter-layer prediction of pictures in all of the enhancement layers associated with the first layer. For instance, a video sequence can include access units, and each of the access units can contain one or more pictures. Each access unit can further be associated with one or more layers of video information (e.g., a base layer and one or more enhancement layers). The layers can each be associated with a layer identification (ID) set or equal to a value (e.g., an integer value). A given layer can be said to "precede" or "be below" a different layer when the given layer is associated with a layer identification (ID) that is lower than the layer identification (ID) associated with the different layer. Conversely, a given layer can be said to "be subsequent to" or "be above" a different layer when the given layer is associated with a layer identification (ID) that is higher than the layer identification (ID) associated with the different layer. For instance, a given layer (e.g., one of the one or more enhancement layers) may be an enhancement layer for a layer that precedes the given layer, such as the base layer or any preceding enhancement layer. For example, a video encoder can analyze pictures in the first layer such that it can indicate to a video decoder whether the first layer pictures can be used for inter-layer prediction of the enhancement layers associated with the first layer. In some cases, if the video encoder indicates that the first layer pictures can be used for inter-layer prediction of the enhancement layers associated with the first layer, the video encoder may also indicate to what extent the pictures in the first layer may be used for inter-layer prediction of the enhancement layers associated with the first layer. For example, the video encoder may indicate that only those pictures being associated with a parameter (e.g., a temporal identification value (TID) or "TID value") whose value is less than a threshold (e.g., a temporal identification value threshold (e.g., a "TID threshold value", "maximum TID", or "Max TID") may be used for inter-layer prediction of the enhancement layers associated with the first layer. For example, at the video parameter set (VPS) level, the video encoder can provide an indication (e.g., a syntax element and/or a flag set to 0 or 1) that indicates to a video decoder whether the pictures from the first layer may be used for inter-layer predicting the enhancement layers associated with the first layer. The video encoder may then provide an additional indication (e.g., a syntax element, a flag, and/or a variable that may be set to a value) that indicates to the video decoder the extent to which the pictures in the first layer may be used for inter-layer prediction of the enhancement layers associated with the first layer, as described above. By providing such indications (e.g., setting certain flags and variables), the video encoder may allow the video decoder to determine whether, and to what extent, to use pictures in the first layer for inter-layer predicting pictures in all of the enhancement layers associated with the first layer.

For example, recent Working Drafts of MV-HEVC WD5 and SHVC WD3 include the flag max_tid_ref_present_flag with the following semantics: "max_tid_ref_present_flag equal to 1 specifies that the syntax element max_tid_ref_pics_plus1[i] is present. max_tid_ref_present_flag equal to 0 specifies that the syntax element max_tid_ref_pics_plus1

[i] is not present." Furthermore, recent Working Drafts of MV-HEVC WD5 and SHVC WD3 include the flag max_tid_il_ref_pics_plus1 in the video parameter set (VPS) with the following semantics: "max_tid_il_ref_pics_plus1[i] equal to 0 specifies that within the CVS non-IRAP pictures with nuh_layer_id equal to layer_id_in_nuh[i] are not used as reference for inter-layer prediction. max_tid_il_ref_pics_plus1[i] greater than 0 specifies that within the CVS pictures with nuh_layer_id equal to layer_id_in_nuh[i] and TemporalId greater than max_tid_il_ref_pics_plus1[i]−1 are not used as reference for inter-layer prediction. When not present, max_tid_il_ref_pics_plus1[i] is inferred to be equal to 7." For example, the video encoder may signal the max_tid_ref_present_flag to indicate that max_tid_il_ref_pics_plus1[i] is present. If it is, then the video encoder may signal max_tid_il_ref_pics_plus1[i] (e.g., to a bitstream that can be stored and/or processed by video decoder) at the VPS-level to indicate whether pictures belonging to a temporal sub-layer (e.g., [i]) are used for inter-layer prediction by higher layer pictures (e.g., in enhancement layers). For example, when the video encoder sets max_tid_il_ref_pics_plus1[i] equal to a value of "0" and signals it to the video decoder, the video decoder can determine that pictures in the [i] layer will not be used for inter-layer prediction for any enhancement layers. As another example, when the video encoder sets max_tid_il_ref_pics_plus1[i] equal to a value greater than "0" (e.g., X), the video decoder can determine that pictures in the [i] layer being associated with a TID value greater than X−1 will not be used for inter-layer prediction for any enhancement layers. The video decoder can use this information to discard (e.g., remove from a buffer) those pictures that are not used for inter-layer prediction.

By using max_tid_ref_present_flag and max_tid_il_ref_pics_plus1[i] in the above described manner, some trade-offs between coding efficiency, memory bandwidth, and computational complexity in HEVC multiple layer extensions can be achieved in various scenarios. For example, when it is determined that the pictures in the first layer will not be used for any other higher layers, the pictures can be discarded to save memory.

However, the current HEVC extension designs have certain shortcomings. For example, the current signaling based on max_tid_il_ref_pics_plus1 as described above requires that inter-layer prediction for pictures that belong to a temporal sub-layer is either enabled or disabled for pictures of all higher layers. For example, if max_tid_il_ref_pics_plus1[i] is set to a value of "2" for a first layer (e.g., [i]="0" or "Layer 0"), then pictures in Layer 0 being associated with a TID value greater than or equal to "2" cannot be used as inter-layer reference for any higher layers. As another example, if max_tid_il_ref_pics_plus1[i] is set to a value of "7" for the first layer (e.g., [i]="0" or "Layer 0"), then pictures in Layer 0 being associated with a TID value greater than or equal to "7" cannot be used as inter-layer reference for any higher layers. In other words, since according to HEVC, the greatest possible value of the TID value is "6," all of the pictures in Layer 0 can be used as inter-layer reference for higher layers in this example.

However, under current HEVC specifications, it is not possible to indicate, for example, that pictures in a first layer (e.g., Layer 0) being associated with a certain TID value (e.g., a value of "2") cannot be used as inter-layer reference (e.g., for inter-layer prediction) for one layer (e.g., Layer 1) but may be used as inter-layer reference for a different layer (e.g., Layer 2). These limitations, create unnecessary decoding complexity requirements (e.g., requiring multi-loop decoding) for pictures that may otherwise be beneficial to decode using lightweight decoding (e.g., single-loop decoding). For example, as the number of layers below any given layer increases, the complexity of decoding the given layer may increase (e.g., to decode Layer 2, it may be necessary to decode Layer 1 and Layer 0 in some instances). In certain instances when coding simplicity is of higher priority than picture quality, it may be more beneficial to decode, for example, Layer 2 without decoding one or more of Layer 1 or Layer 0. Therefore, it would be beneficial to permit a video encoder to provide separate, independent definitions of inter-layer prediction dependency for a first layer with respect to each of a number of enhancement layers associated with the first layer. Such configurations may be beneficial (e.g., provide resource trade-off flexibilities) in a number of coding scenarios, e.g., in real-time application scenarios.

Thus, the present disclosure describes techniques for separately defining (sometimes referred to as independently defining) inter-layer prediction dependencies for a first layer with respect to each of a number of enhancement layers associated with the first layer using indications and/or determinations related to certain properties of the pictures in the first layer and/or the pictures in the associated enhancement layers. For example, the present disclosure describes techniques for defining, indicating, and/or determining whether pictures in the first layer can be used for inter-layer prediction of a first enhancement layer while separately defining, indicating, and/or determining whether pictures in the first layer can be used for inter-layer prediction of a second enhancement layer. In addition, an encoder may be adapted to indicate that pictures (e.g., pictures being associated with a TID value greater than a TID threshold value) are not to be used for inter-layer prediction for one layer but may be used for inter-layer prediction for another layer. Following the examples described above, the present disclosure describes, for example, techniques for restricting one or more of the pictures in Layer 0 from being used for inter-layer prediction of pictures in Layer 1, while not restricting any of the pictures in Layer 0 from being used for inter-layer prediction of pictures in Layer 2. Such embodiments provide the flexibility to have lightweight decoding (e.g., single loop decoding) for Layer 1 and high-quality decoding (e.g., multi-loop decoding) for Layer 2. In other examples, the pictures in Layer 0 may be restricted or not restricted from being used in inter-layer prediction for Layer 1, Layer 2, and/or any other layer in different ways, as described in connection with FIGS. 4-6, as described below.

Therefore, the techniques described herein may include various methods for improving inter-layer prediction dependency signaling methods, such as those methods related to signaling sub-layer inter-layer prediction dependency separately for all direct dependent layers. For example, the improved methods may be integrated in, for example, HEVC extensions, and applied to scalable coding, multi-view coding (e.g., with or without depth), and any other extension of HEVC and/or other multi-layer video codecs. Any of the methods described may be applied independently from each other or in combination.

Advantages of the techniques described in the present disclosure, among other advantages, may include reducing memory allocation during inter-layer prediction. As compared to the current methods in MV-HEVC WD5 and SHVC WD3, the techniques described in the present disclosure may also allow resource trade-off flexibility in certain coding scenarios, such as implementing lightweight decoding (e.g., single-loop decoding) for one layer while implementing high-quality decoding (e.g., multi-loop decoding) for another layer, as described above.

Figure 1B:
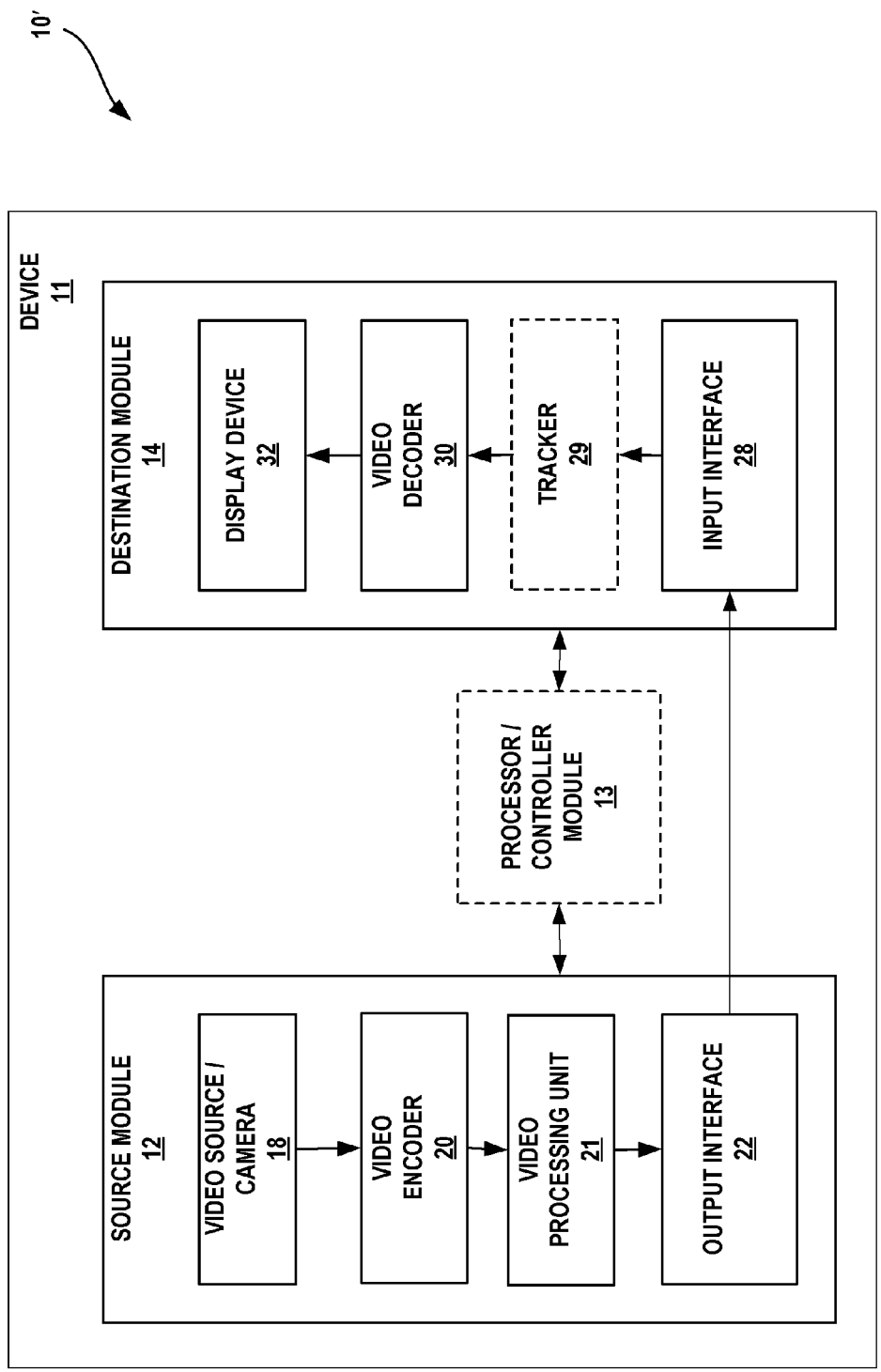
FIG. 1B is a block diagram illustrating another example video encoding and decoding system that may perform the separate inter-layer prediction dependency definition techniques described in this disclosure.

FIG. 1A is a block diagram illustrating an example video encoding and decoding system 10 that may utilize the separate inter-layer prediction dependency definition techniques described in this disclosure. As shown in FIG. 1A, system 10 includes a source module 12 that generates encoded video data to be decoded at a later time by a destination module 14. In the example of FIG. 1A, the source module 12 and destination module 14 are on separate devices—specifically, the source module 12 is part of the source module, and the destination module 14 is part of a destination device. It is noted, however, that the source and destination modules 12, 14 may be on or part of the same device, as shown in the example of FIG. 1B.

With reference once again, to FIG. 1A, the source module 12 and the destination module 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source module 12 and the destination module 14 may be equipped for wireless communication.

The destination module 14 may receive the encoded video data to be decoded via a link 16. The link 16 may comprise any type of medium or device capable of moving the encoded video data from the source module 12 to the destination module 14. In the example of FIG. 1A, the link 16 may comprise a communication medium to enable the source module 12 to transmit encoded video data directly to the destination module 14 in real-time. The encoded video data may be modulated according to a communication standard, such as a wireless communication protocol, and transmitted to the destination module 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source module 12 to the destination module 14.

Alternatively, encoded data may be output from an output interface 22 to an optional storage device 31. Similarly, encoded data may be accessed from the storage device 31 by input interface. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source module 12. The destination module 14 may access stored video data from the storage device 31 via streaming or download. The file server may be any type of server capable of storing encoded video data and transmitting that encoded video data to the destination module 14. Example file servers include a web server (e.g., for a website), an FTP server, network attached storage (NAS) devices, or a local disk drive. The destination module 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 31 may be a streaming transmission, a download transmission, or a combination of both.

In the example of FIG. 1A, the source module 12 includes a video source 18, video encoder 20 and an output interface 22. In some cases, the output interface 22 may include a modulator/demodulator (modem) and/or a transmitter. In the source module 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source module 12 and the destination module 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted directly to the destination module 14 via the output interface 22 of the source module 12. The encoded video data may also (or alternatively) be stored onto the storage device 31 for later access by the destination module 14 or other devices, for decoding and/or playback.

The destination module 14 includes an input interface 28, a video decoder 30, and a display device 32. In some cases, the input interface 28 may include a receiver and/or a modem. The input interface 28 of the destination module 14 may receive the encoded video data over the link 16. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination module 14. In some examples, the destination module 14 may include an integrated display device and also be configured to interface with an external display device. In other examples, the destination module 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination modules 12, 14 are on or part of a device or user device 11. The device 11 may be a telephone handset, such as a "smart" phone or the like. The device 11 may include an optional controller/processor module 13 in operative communication with the source and destination modules 12, 14. The system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller module 13. The system 10' may also include an optional tracker 29, which can track an object of interest in a video sequence. The object or interest to be tracked may be segmented by a technique described in connection with one or more aspects of the present disclosure. In related aspects, the tracking may be performed by the display device 32, alone or in conjunction with the tracker 29. The system 10' of FIG. 1B, and components thereof, are otherwise similar to the system 10 of FIG. 1A, and components thereof.

As described in greater detail below, aspects of this disclosure generally relate to separately defining inter-layer prediction dependencies for a first layer with respect to each of a number of enhancement layers associated with the first layer. For example, defining, indicating, and/or determining whether pictures in the first layer can be used for inter-layer prediction of a first enhancement layer while separately defining, indicating, and/or determining whether pictures in the first layer can be used for inter-layer prediction of a second enhancement layer. The techniques of this disclosure may be performed by the video encoder 20, the video decoder 30, and/or the processor/controller module 13.

In one example, the video encoder 20 and the video decoder 30 may operate according to video compression standards, including HEVC or the like. In another example, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. Other examples of video compression standards include MPEG-2 and ITU-T H.263. The techniques of this disclosure, however, are not limited to any particular coding standard or technique.

Although not shown in FIGS. 1A-B, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The UM presumes several additional capabilities of video coding devices relative to existing devices according to, e.g., ITU-T H.264/AVC. For example, whereas H.264 provides nine intra-prediction encoding modes, the UM may provide as many as thirty-three intra-prediction encoding modes.

In general, the working model of the UM describes that a video frame or picture may be divided into a sequence of coding tree units (CTUs), also referred to as largest coding units (LCUs), that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

Figure 2:
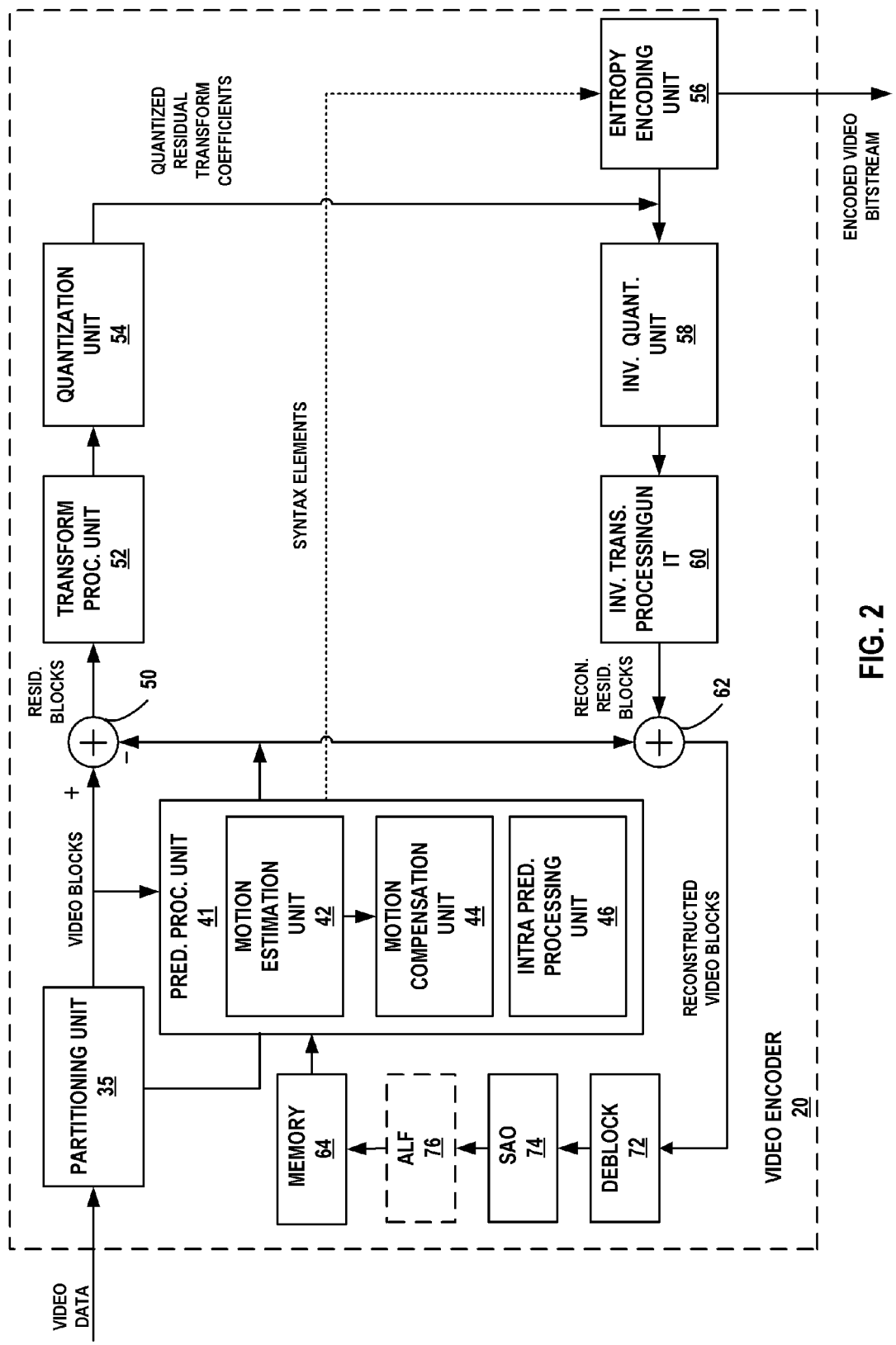
FIG. 2 is a block diagram illustrating an example video encoder that may implement the separate inter-layer prediction dependency definition techniques described in this disclosure.

FIG. 2 is a block diagram illustrating an example video encoder 20 that may implement the separate inter-layer prediction dependency definition techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, memory 64 (which may also be referred to as reference picture memory 64), summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Deblocking filter 72 may also be included to filter block boundaries to remove blockiness artifacts from reconstructed video. As shown in FIG. 2, video encoder 20 also includes additional loop filters, including sample adaptive offset (SAO) filter 74 and an optional adaptive loop filter (ALF) 76. Although deblocking filter 72 and SAO filter 74, and optional ALF 76 are shown as being in-loop filters in FIG. 2, in some configurations deblocking filter 72, SAO filter 74, and optional ALF 76 may be implemented as post-loop filters. Additionally, one or more of deblocking filter 72 and optional ALF 76 may be omitted in some implementations of the techniques of this disclosure. In particular, ALF 76 would be omitted in implementations for HEVC, since ALF 76 does not exist in HEVC.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, which may include a partition size, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as predicted slices (P slices), bi-direction predicted slices (B slices), or generalized PB slices (GPB slices). Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may perform intra-prediction on a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and prediction processing unit 41 may select an appropriate intra-prediction or inter-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, prediction processing unit 41 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64.

Prior to storage in memory 64, the reconstructed residual block can be filtered by one or more filters. If desired, deblocking filter 72 may also be applied to filter the reconstructed residual blocks in order to remove blockiness artifacts. Other loop filters (either in the coding loop or after the coding loop) may also be used to smooth pixel transitions, or otherwise improve the video quality. One example of such a loop filter is SAO filter 74. The reference block may be used by motion estimation unit 42 and motion compensation unit 44 as a reference block to inter-predict a block in a subsequent video frame or picture.

SAO filter 74 can determine offset values for SAO filtering in a manner that improves video coding quality. Improving video coding quality may, for example, involve determining offset values that make a reconstructed image more closely match an original image. Video encoder 20 may, for example, code the video data using multiple passes with different offset values and choose, for inclusion in an encoded bitstream, the offset values that offer a desirable coding quality, as determined based on a rate-distortion calculation, for example.

In some configurations, SAO filter 74 may be configured to apply one or more types of offset, such as edge offset described above. SAO filter 74 may also at times apply no offset, which can itself be considered a third type of offset. The type of offset applied by SAO filter 74 may be either explicitly or implicitly signaled to a video decoder. When applying edge offset, pixels can be classified based on edge information.

Video encoder 20 of FIG. 2 represents an example of a video encoder configured to determine a first edge index, wherein the first edge index comprises an edge index for a luma component of a first surrounding pixel, determine a second edge index, wherein the second edge index comprises an edge index for a luma component of a second surrounding pixel, determine a third edge index based on the first edge index and the second edge index, wherein the third edge index comprises an edge index for a chroma component of a current pixel, select an offset based on the third edge index, and apply the offset to the chroma component of the current pixel.

Figure 3:
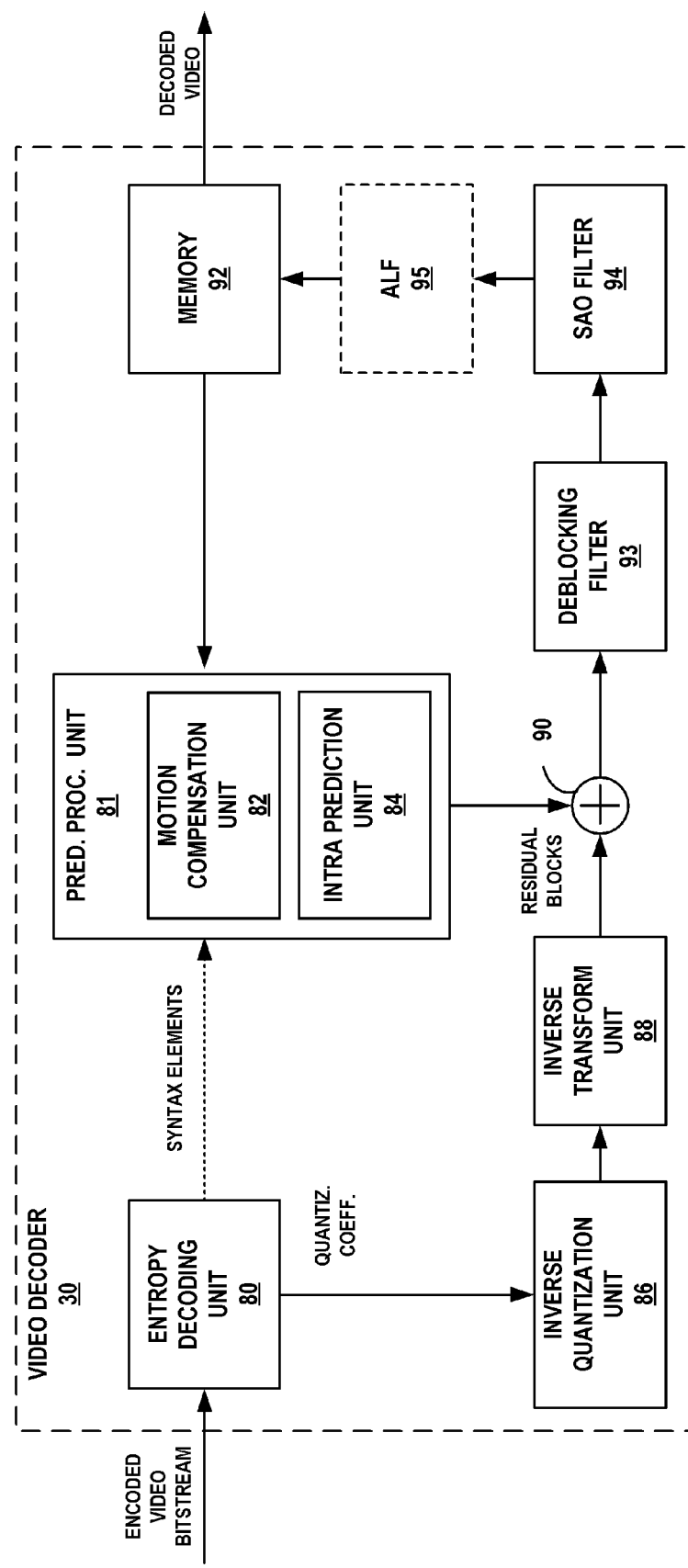
FIG. 3 is a block diagram illustrating an example video decoder that may implement the separate inter-layer prediction dependency definition techniques described in this disclosure.

FIG. 3 is a block diagram illustrating an example video decoder 30 that may implement the separate inter-layer prediction dependency definition techniques described in this disclosure. In the example of FIG. 3, video decoder 30 includes an entropy decoding unit 80, prediction processing unit 81, inverse quantization unit 86, inverse transformation unit 88, summer 90, and reference picture memory 92. Prediction processing unit 81 includes motion compensation unit 82, for inter-prediction decoding, and intra prediction processing unit 84, for intra-prediction decoding. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. The decoded video blocks formed by summer 90 may then be filtered by a deblocking filter 93, SAO filter 94, and optional ALF 95. Optional ALF 95 represents an optional filter that may be excluded from some implementations. It is noted that ALF 95 would be omitted in implementations for HEVC, since ALF 95 does not exist in HEVC. The decoded video blocks in a given frame or picture are then stored in reference picture memory 92, which stores reference pictures used for subsequent motion compensation. Reference picture memory 92 also stores decoded video for later presentation on a display device, such as display device 32 of FIGS. 1A-B. In related aspects, SAO filter 94 can be configured to apply one or more of the same filtering (e.g., edge offset and band offset) as SAO filter 74 discussed above.

Video decoder 30 of FIG. 3 represents an example of a video decoder configured to determine a first edge index, wherein the first edge index comprises an edge index for a luma component of a first surrounding pixel, determine a second edge index, wherein the second edge index comprises an edge index for a luma component of a second surrounding pixel, determine a third edge index based on the first edge index and the second edge index, wherein the third edge index comprises an edge index for a chroma component of a current pixel, select an offset based on the third edge index, and apply the offset to the chroma component of the current pixel.

In accordance with one or more aspects of the present disclosure, there are provided techniques for separately (e.g., independently) providing (sometimes referred to as defining, establishing, processing and/or determining) inter-layer prediction dependencies for a first layer with respect to each of a number of enhancement layers associated with the first layer. In some embodiments, a processor is configured to determine (e.g., with a first indicator) whether pictures in the first layer can be used for inter-layer prediction of a first enhancement layer while separately and independently determining (e.g., with a second indicator) whether the pictures in the first layer can be used for inter-layer prediction of a second enhancement layer. The techniques may be performed by a system or, for example, by the device 10 of FIG. 1B. In some implementations, the techniques may be performed by the video encoder 20, the video decoder 30, and/or the processor-controller module 13, alone or in combination.

Figure 4:
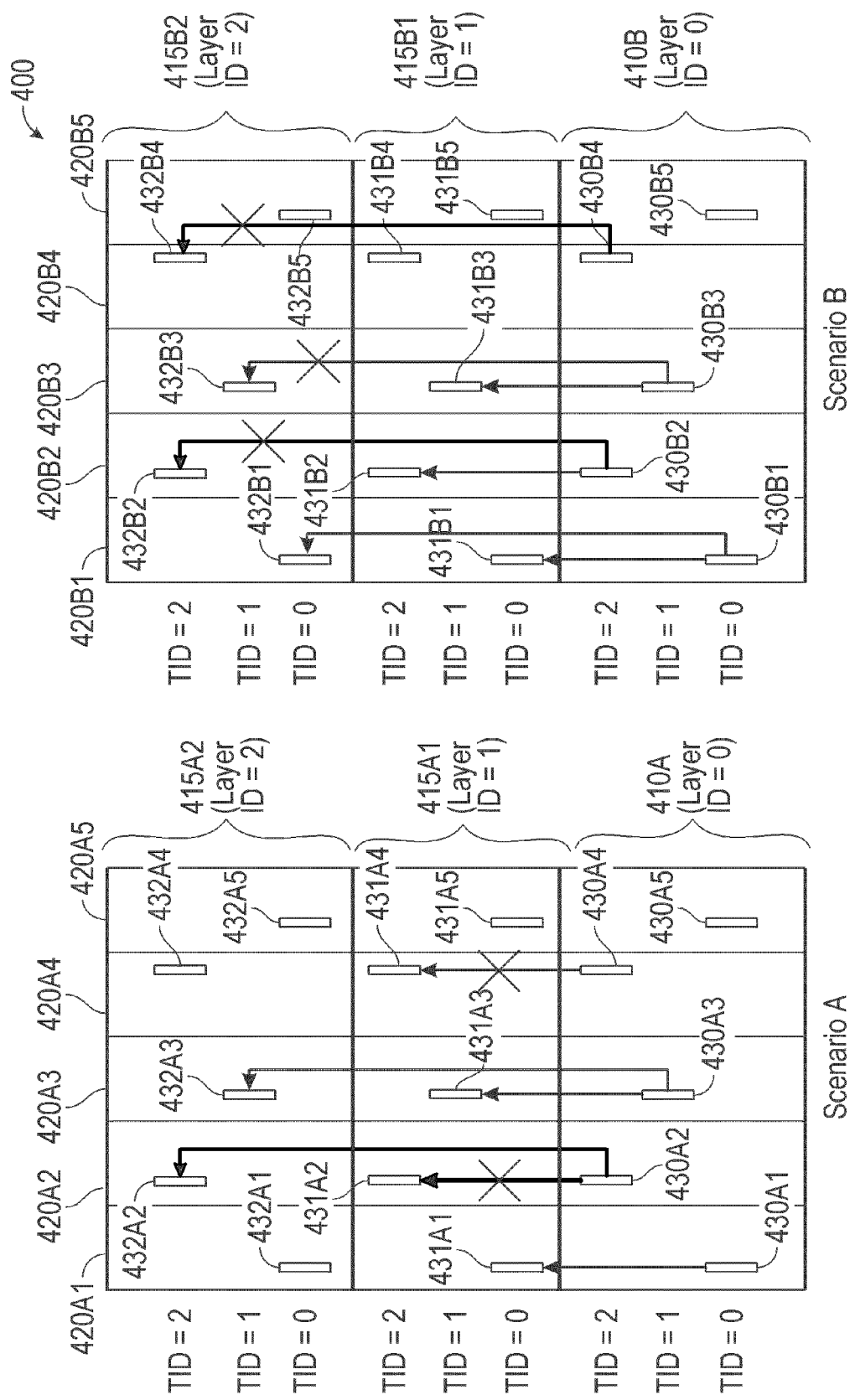
FIG. 4 is a diagram illustrating examples of multiple access units, each access unit having multiple layers, each layer having multiple pictures.

FIG. 4 is a diagram 400 illustrating examples of multiple access units, each access unit having multiple layers, each layer having multiple pictures. Some of the access units illustrate scenarios where separately indicated (e.g., at a video encoder) inter-layer prediction dependencies for a first layer with respect to independent enhancement layers have been employed. For example, in some of the illustrated access units, a first indicator indicates that a picture from a first layer (e.g., Layer ID=0) may be used to predict a picture from a first enhancement layer, and a second indicator indicates that the picture from the first layer may not be used to predict a picture from a second enhancement layer. The first and second indicators are independently signaled (e.g., they signal independent inter-layer prediction dependencies) as different indicators. For example, in the illustrated diagram, indications are provided that can be used to signal or determine whether pictures in the first layer can be used for inter-layer prediction of the first enhancement layer while separately indicating (or determining) whether pictures in the first layer can be used for inter-layer prediction of the second enhancement layer. The indication as to whether any given enhancement layer is dependent on the first layer for inter-layer prediction may be the same or different (e.g., independent) from the indication as to whether any other given enhancement layer is dependent on the first layer for inter-layer prediction. In one aspect, one or more of the features described in connection with FIG. 4 may generally be performed by an encoder (e.g., the video encoder 20 of FIGS. 1B and/or 2) and/or a decoder (e.g., the video decoder 30 of FIGS. 1B and/or 3). In one embodiment, the video encoder 20 may provide the dependency indications to the video decoder 30 such that the video decoder 30 may perform various further determinations and/or operations as described below. In other embodiments, the dependency indications may be processed, determined, defined, indicated, analyzed, and/or utilized by one or more different devices. The various aspects described in connection with FIG. 4 may be included in a memory unit (e.g., the storage device 32 of FIG. 1A, the memory 64 of FIG. 2, the memory 92 of FIG. 3, etc.). The various operations described in connection with FIG. 4 may be performed by a processor (e.g., the processor 13 of FIG. 1A, the video processing unit 21 of FIG. 1B, the prediction processing unit 41 of FIG. 2, etc.). The video encoder 20, the video decoder 30, the storage device 32, and/or the processor 13 may be in communication with and/or operationally connected to each other.

In the example illustration, two scenarios are presented: (1) "Scenario A" and (2) "Scenario B." Each scenario represents access units, layers and pictures where a particular set of dependency indications are independently signaled. Each of the columns represents an access unit in a video sequence. For example, access units 420A1 through 420A5 represent five access units in a video sequence of Scenario A. The access units may be referred to collectively as the access units 420. In one embodiment, the video sequence may include any number of access units 420. Each of the access units 420A1-420A5 may contain one or more pictures and may be associated with one or more layers. For example, in Scenario A, each access unit 420A1-A5 includes three layers 410A, 415A1, and 415A2. Each layer contains a plurality of pictures, and there is one picture in each access unit. The lowest illustrated layer (410A) may be referred to as a base layer, a current layer, and/or a first layer. There may be additional layers above or below the first layer 410A (not pictured). The layers above the first layer 410A (415A1 and 415A2) may be considered enhancement layers of the first layer 410A. In some aspects, the first layer 410A may have further enhancement layers (not pictured). An enhancement layer may sometimes be referred to as an "enhanced layer." In the illustrated example, the first layer 410A may also be referred to as "Layer 0," because it has a layer identification number equal to "0." In some embodiments, the processor 13 may use the layer identification number for various determinations, as further described below. In some embodiments, the layer identification number may be represented by a variable, e.g., an HEVC-based variable, LayerID. Similarly, the enhancement layers 415A1, 415A2 may each have layer identification numbers. In the illustrated example, the enhancement layers 415A1 and 415A2 have a layer identification number equal to 1 and 2, respectively, and thus, may also be referred to as "Layer 1" and "Layer 2," respectively.

As stated above, each of the layers (410A, 415A1, 415A2) may include one or more pictures. Thus, each picture is associated with one layer and one access unit. In the example illustration, each of the access units 420 contains one picture in each layer; however, in other examples, each access unit 420 may contain more than one picture in each layer. In one embodiment, a picture associated with the first layer 410A may be referred to as a current picture or a "first picture." The first pictures in FIG. 4 include first pictures 430A1, 430A2, 430A3, 430A4, and 430A5. The first pictures 430A1, 430A2, 430A3, 430A4, and 430A5 may be referred to collectively as first pictures 430. The first picture 430A1 is within the first layer 410A and the access unit 420A1. As another example, the first picture 430A3 is the picture within the first layer 410A and the access unit 420A3. Pictures in layers that are not the first layer may be referred to as enhancement pictures. For example, enhancement picture 431A1-A5 (collectively referred to as enhancement picture 431) are located in enhancement layer 415A1, and enhancement pictures 432A1-A5 (collectively referred to as enhancement pictures 432) are in enhancement layer 415A2. Enhancement pictures may also be referred to as "enhancement layer pictures." For example, the enhancement picture 431A2 is within enhancement layer 415A1 and access unit 420A2. As another example, enhancement picture 432A4 is within enhancement layer 415A2 and access unit 420A4. In one embodiment, the each of the enhancement pictures 431 and 432 located within the same access unit as a first picture may be enhancement pictures of such first picture. For example, enhancement pictures 431A3 and 432A3 are enhancement pictures of the first picture 430A3.

Each of the pictures 430, 431, and 432 may be associated with a temporal identification number or value (a "TID value"), as illustrated on the left side of each Scenario. For example, the enhancement picture 431A3 is associated with a TID value equal to "1." As another example, the enhancement picture 430A2 is associated with a TID value equal to "2." As illustrated, each of the pictures 430, 431, and 432 that are within the same one of the access units 420 are associated with the same TID value. In other embodiments, all of the pictures within the same one of the access units 420 need not be associated with the same TID value. In some embodiments, the processor 13 may compare the TID value associated with one of the pictures 430, 431, or 432 with a threshold associated with a pair of layers (e.g., a "maximum TID," a "Max TID," a "TID threshold," or a "TID threshold value"), as further described below in connection with FIGS. 5 and 6.

The processor 13 may perform operations based on the properties of one of the pictures 430 with respect to its associated enhancement pictures (e.g., the enhancement pictures 431 and/or 432 in the same access unit as the one of the pictures 430), as further described below in connection with FIGS. 5 and 6. For example, the processor 13 may separately indicate or determine whether pictures in the first layer 410A may be used for inter-layer predicting pictures in one or more of the enhancement layers 415. In other words, the processor 13 may separately indicate or determine whether each of the enhancement layers 415 may use the first layer 410 for inter-layer prediction of each enhancement layer 415. If the indication indicates that pictures in the first layer 410A may be used for inter-layer prediction of the pictures in one of the enhancement layers 415, then the respective enhancement layer 415 is dependent on the first layer 410A. For example, as described above, the processor 13 may separately indicate (e.g., with a first indicator) whether the enhancement layer 415A1 is dependent on the first layer 410A for inter-layer prediction while separately indicating (e.g., in a second indicator) whether the enhancement layer 415A2 is dependent on the first layer 410A for inter-layer prediction. The two separate, distinct dependency indications may have the same or different values. If additional enhancement layers are provided (not pictured), the processor 13 may indicate separately for each of the enhancement layers 415 whether the additional enhancement layers are dependent on the first layer 410, as well.

In the illustrated Scenarios A and B, the processor 13 has indicated that the first layers 410A (in Scenario A) and 410B (Scenario B), include pictures that may be used for inter-layer prediction. For example, each of the enhancement layers 415A1 and 415A2 are dependent on first layer 410A, and each of the enhancement layers 415B1 and 415B2 are dependent on first layer 410B. Arrows (without an X) extending between pictures indicate pictures of the first layer 410A, 410B may be used to predict pictures in one or more of the enhancement layers 415A1, 415A2, 415B1, 415B2. In one embodiment, even when one of the enhancement layers 415 is dependent on one of the first layers 410, some of the first pictures 430 in the first layer 410 may be restricted from use for inter-layer predicting respective enhancement pictures 431, 432. Such restriction is indicated by an X located over the arrow pointing from the restricted one of the first pictures 410 to the corresponding one of the enhancement pictures 431 or 432. The restriction from use may be based on a TID threshold value associated with the current layer 410 and the associated enhancement layers 415, as further described below and in connection with FIGS. 5 and 6. In some embodiments, even though a first pictures (e.g., first picture 430A5) is not restricted from being used for inter-layer predicting its respective enhancement pictures (e.g., enhancement pictures 431A5, 432A5), it may nonetheless not be used for inter-layer prediction. In such embodiment, no arrow extends between the first picture (e.g., first picture 430A5) and its respective enhancement pictures (e.g., enhancement pictures 431A5, 432A5).

In one embodiment (e.g., in the illustrated Scenario A), a processor (e.g., processor 13) may determine (e.g., indicate, receive, send, etc.) a first TID threshold value that may be used to determine whether pictures in the first layer 410A may be used to inter-layer predict pictures in the first layer's first enhancement layer 415A1. The processor may further determine a second TID threshold value to be used to determine whether pictures in the first layer 410A may be used to inter-layer predict pictures in the first layer's second enhancement layer 415A2. The first and second TID threshold values may be the same or different from each other.

In the embodiments of FIG. 4, a first TID threshold is specified for a first layer pair, such as the first layer 410A and the first enhancement layer 415A1. The first TID threshold is used to determine whether pictures in the first layer 410A may be used for inter-layer prediction of pictures in the first enhancement layer 415A1. A second TID threshold is provided for a second layer pair, such as the first layer 410A and the second enhancement layer 415A2. The second TID threshold is used to determine whether pictures in the first layer 410A may be used for inter-layer prediction of pictures in the second enhancement layer 415A2. Additional TID thresholds may be provided for additional layer pairs. In the illustrated embodiment of Scenario A, the first TID threshold value is a value of "2". Thus, as further described in connection with FIGS. 5 and 6, pictures in the first layer 410A being associated with a TID value below "2" may be used for inter-layer prediction of pictures in the first enhancement layer 415A1 (e.g., they are not restricted for use in inter-layer prediction). Accordingly, the first pictures 430A2 and 430A4, which are associated with a TID value of "2" (which is not below "2") are restricted from use for inter-layer prediction of the enhancement pictures 431A2 and 431A4, respectively (each restriction shown as an arrow with an X). Conversely, the first pictures 430A1 (which has a TID value of "0"), 430A3 (which has a TID value of "1"), and 430A5 (which has a TID value of "0"), which each are associated with TID values below "2", are not restricted from use for inter-layer prediction of their respective first enhancement layer pictures 431A1, 431A3, and 431A5. As stated above, some of the allowed pictures may be used for inter-layer prediction (as indicated by an arrow), while others may not be used for inter-layer prediction (as indicated by the absence of an arrow). Such a configuration provides flexibility to implement lightweight decoding (e.g., single loop decoding) for the first enhancement layer pictures 431A2 and 431A4 and high-quality decoding (e.g., multi-loop decoding) for one or more of the first enhancement layer pictures 431A1, 431A3, and 431A5. Furthermore, in some embodiments, the TID threshold values may be used in different ways. For example, in some embodiments, an indicator may indicate that one or more of the pictures in the first layer 410A that are associated with a TID value below one less than a TID threshold value may be used for inter-layer prediction of pictures in associated enhancement layers 415. In other embodiments, the indictor is used to analyze a TID threshold value in a different way.

Further in the illustrated embodiment of Scenario A, the second TID threshold value may be a value of "4." Thus, as further described in connection with FIGS. 5 and 6, pictures in the first layer 410A that are associated with a TID value below 4 may be used for inter-layer prediction of pictures in the second enhancement layer 415A2. Accordingly, all of the first pictures 430A1 (which has a TID value of "0"), 430A2 (which has a TID value of "2"), 430A3 (which has a TID value of "1"), 430A4 (which has a TID value of "2"), and 430A5 (which has a TID value of "0"), which each are associated with a TID value below "4," are not restricted from use for inter-layer prediction of their respective second enhancement layer pictures 432A1, 432A2, 432A3, 432A4, and 432A5. As discussed above, some of the not-restricted pictures may be used for inter-layer prediction (as indicated by an arrow), while others may not be used for inter-layer prediction (as indicated by the absence of an arrow).

In another embodiment (e.g., in the illustrated Scenario B), a processor (e.g., processor 13) may determine (e.g., indicate, receive, send, etc.) a first TID threshold value that may be used to determine whether pictures in the first layer 410B may be used to inter-layer predict pictures in the first layer's first enhancement layer 415B1. The processor may further determine a second TID threshold value to be used to determine whether pictures in the first layer 410B may be used to inter-layer predict pictures in the first layer's second enhancement layer 415B2. The first and second TID threshold values may be the same or different from each other.

In the illustrated embodiment of Scenario B, the first TID threshold value may be a value of "6." Thus, as further described in connection with FIGS. 5 and 6, pictures in the first layer 410B that are associated with a TID value below "6" may be used for inter-layer prediction of pictures in the first enhancement layer 415B1 (e.g., they are not restricted for use in inter-layer prediction). Accordingly, all of the first pictures 430B1 (which has a TID value of "0"), 430B2 (which has a TID value of "2"), 430B3 (which has a TID value of "1"), 430B4 (which has a TID value of "2"), and 430B5 (which has a TID value of "0"), which each are associated with TID values below "6", are not restricted from use for inter-layer prediction of their respective second enhancement layer pictures 431B1, 431B2, 431B3, 431B4, and 431B5. As discussed above, some of the not-restricted pictures may be used for inter-layer prediction (as indicated by an arrow), while others may not be used for inter-layer prediction (as indicated by the absence of an arrow).

Further in the illustrated embodiment of Scenario B, the second TID threshold value is a value of "1". Thus, as further described in connection with FIGS. 5 and 6, pictures in the first layer 410B that are associated with a TID value below "1" may be used for inter-layer prediction of pictures in the second enhancement layer 415B2 (e.g., they are not restricted for use in inter-layer prediction). Accordingly, the first pictures 430B2 (which has a TID value of "2"), 430B3 (which has a TID value of "1"), and 430B4 (which has a TID value of "2"), which are each associated with a TID value of "1" or higher are restricted from use for inter-layer prediction of the enhancement pictures 432B2, 432B3, and 432B4, respectively (each restriction shown as an arrow with an X). Conversely, the first pictures 430B1 and 430B5, which each are associated with TID values of "0" (which is below a value of "1"), are not restricted from use for inter-layer prediction of their respective first enhancement layer pictures 431B1 and 431B5. As discussed above, some of the not-restricted pictures may be used for inter-layer prediction (as indicated by an arrow), while others may not be used for inter-layer prediction (as indicated by the absence of an arrow).

In other aspects, as described above, the processor 13 may separately indicate that none of the pictures in the first layer may be used for inter-layer predicting pictures of one or more second layers (e.g., of one or more enhancement layers). In such an embodiment (not pictured), the decoder 30 may discard (e.g., remove from a buffer) such first layer pictures. As described herein, discarding such first layer pictures may save memory and processing costs during inter-layer prediction of an associated enhancement layer.

For example, such a configuration may allow for the flexibility to implement lightweight decoding (e.g., single loop decoding) for all of the associated enhancement pictures with respect to the pictures in the first layer.

In the context of the current HEVC extension methods described above, in one embodiment, the techniques described in connection with FIG. 4 may be used to modify certain HEVC semantics so as to enable a video encoder to set the max_tid_ref_present_flag equal to 1 to specify that the syntax element max_tid_il_ref_pics_plus1 is present and associated with a first layer (e.g., the first layer 410A) with respect to a second layer (e.g., the first enhancement layer 415A1). For example, a new semantics definition of the max_tid_ref_present_flag flag may include: "max_tid_ref_present_flag equal to 1 specifies that the syntax element max_tid_il_ref_pics_plus1[i][j] is present. max_tid_ref_present_flag equal to 0 specifies that the syntax element max_tid_il_ref_pics_plus1[i][j] is not present." In the new definition, the [j] index value may represent a second layer (e.g., an enhancement layer).

Using the new semantics definition of max_tid_ref_present_flag, certain other HEVC semantics may be modified so as to enable separately defining, for each of the enhancement layers, whether pictures in the first layer can be used for inter-layer prediction of the enhancement layer picture in the respective enhancement layer. For example, a new semantics definition of max_tid_il_ref_pics_plus1[i][j] may include: "max_tid_il_ref_pics_plus1[i][j] equal to 0 specifies that within the CVS non-IRAP pictures with nuh_layer_id equal to layer_id_in_nuh[i] are not used as reference for inter-layer prediction for pictures with nuh_layer_id equal to layer_id_in_nuh[j]. max_tid_il_ref_pics_plus1[i][j] greater than 0 specifies that within the CVS pictures with nuh_layer_id equal to layer_id_in_nuh[i] and TemporalId greater than max_tid_il_ref_pics_plus1[i][j]−1 are not used as reference for inter-layer prediction for pictures with nuh_layer_id equal to layer_id_in_nuh[j]. When not present, max_tid_il_ref_pics_plus1[i][j] is inferred to be equal to 7."

In the new definition, the [j] index value and its associated text may represent a second layer (e.g., an enhancement layer). One example implementation of these new definitions is shown in syntax Table 1 below, where the new index value, [j], is represented:

TABLE 1

| vps_extension( ) { | Descriptor |
|---|---|
|   avc_base_layer_flag | u(1) |
| ........ | |
|   for( i = 1; i <= vps_max_layers_minus1; i++ ) | |
|     for( j = 0; j < i; j++ ) | |
|       direct_dependency_flag[ i ][ j ] | u(1) |
|   max_tid_ref_present_flag | u(1) |
|   if( max_tid_ref_present_flag ) | |
|     for( i = 0; i < vps_max_layers_minus1; i++ ) | |
|       for( j = i +1; j <= vps_max_layers_minus1; j++ ) | |
|         if( direct_dependency_flag[ j ][ i ] ) | |
|           max_tid_il_ref_pics_plus1[ i ][ j ] | u(3) |
| .......... | u(1) |
|   vps_vui_present_flag | u(1) |
|   if( vps_vui_present_flag ) { | |
|     while( !byte_aligned( ) ) | |
|       vps_vui_alignment_bit_equal_to_one | u(1) |
|     vps_vui( ) | |
|   } | |
| } | |

Furthermore, in some embodiments, other general slice segment header semantics may be changed based on the use of the [j] index value as described above. For example, with respect to the bitstream, for each value of i in the range of 0 to some HEVC-based variable (e.g., NumActiveRefLayerPics−1), inclusive, at least one of two conditions may be true: (1) the value of max_tid_il_ref_pics_plus1[LayerIdxInVps[RefPicLayerId[i]]][LayerIdxInVps[nuh_layer_id] may be greater than TemporalId; and (2) the values of max_tid_il_ref_pics_plus1[LayerIdxInVps[RefPicLayerId[i]]][LayerIdxInVps[nuh_layer_id] and TemporalId may both be equal to 0 and the picture in the current access unit with nuh_layer_id equal to RefPicLayerId[i] may be an IRAP picture.

Furthermore, in some embodiments, certain processes (e.g., a marking process) for sub-layer non-reference pictures may not be necessary for inter-layer prediction in some instances. Following this result, example code that uses the [j] index value may include:

```
remainingInterLayerReferencesFlag = 0
iLidx = LayerIdxInVps[ TargetDecLayerIdList[ i ] ]
for( j = latestDecIdx + 1; j < numTargetDecLayers; j++ ) {
    jLidx = LayerIdxInVps[ TargetDecLayerIdList[ j ] ]
    if( currTid <= ( max_tid_il_ref_pics_plus1[ iLidx ][ jLidx ] −1 ) )
        for( k = 0; k < NumDirectRefLayers[ TargetDecLayerIdList[ j ] ]; k++ )
            if( TargetDecLayerIdList[ i ] == RefLayerId[ TargetDecLayerIdList[ j ] ][ k ] )
                remainingInterLayerReferencesFlag = 1
}
```

The processor 13, the video encoder 20, and/or the video decoder 30 may indicate, determine, define, analyze, and/or utilize the above-described indications and determinations in a number of ways. FIGS. 5 and 6 provide flowcharts of example methods that the video encoder 20 and the video decoder 30, respectively, may perform with respect to indicating and/or determining, respectively. In other embodiments, other devices may perform one or more of the described method steps.

Figure 5:
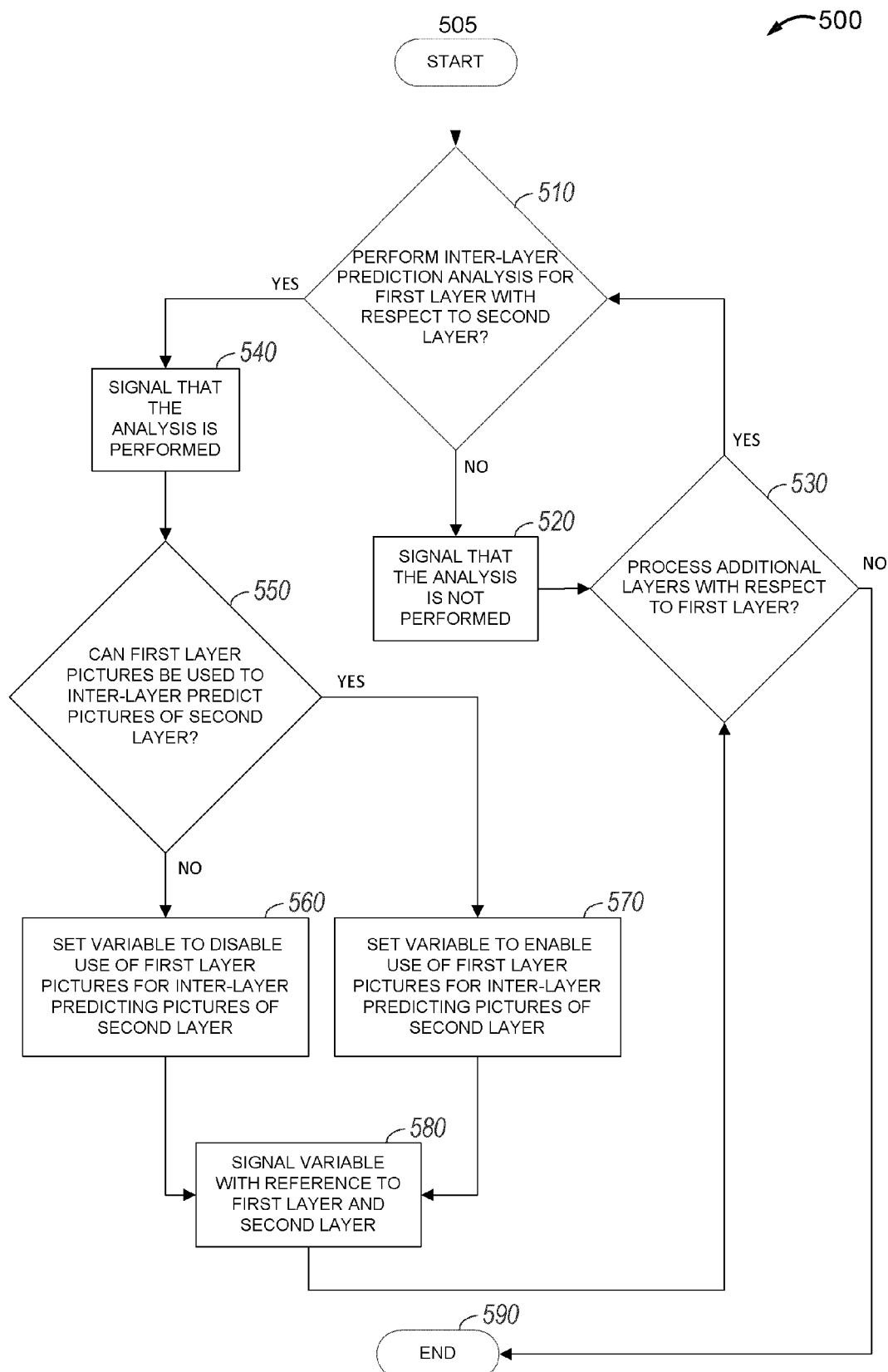
FIG. 5 illustrates a flowchart of one method for a processor of a video encoder to separately indicate inter-layer prediction dependencies for a first layer with respect to one or more second layers.

FIG. 5 illustrates a flowchart of one method for a processor (e.g., the processor 13) of a video encoder (e.g., the video encoder 20) to separately indicate inter-layer prediction dependencies for a first layer (e.g., the first layer 410 of FIG. 4) with respect to one or more second layers (e.g., the enhancement layers 415 of FIG. 4). The processor 13 may separately indicate, for each of the second layers, whether the pictures in the first layer can be used for inter-layer prediction of picture in a respective second layer.

The method starts at block 505. At block 510, the processor 13 may determine whether to perform inter-layer prediction analysis of the first layer (e.g., first layer 410A) with respect to a second layer (e.g., the first layer's first enhancement layer 415A1). In one aspect, the processor 13 may make this determination based on whether the processor 13 has enough information (e.g., in a slice header) to perform inter-layer prediction analysis (e.g., at block 550, as described below) of the first layer with respect to the second layer. As one example, the processor 13 may determine not to perform inter-layer prediction analysis of the first layer with respect to the second layer if the second layer is not directly dependent on the first layer.

If, at block 510, the processor 13 determines not to perform inter-layer prediction analysis of the first layer with respect to the second layer, then at block 520, the processor 13 may signal that the inter-layer prediction analysis is not performed for this first layer/enhancement layer association. In one embodiment, if the processor 13 processes additional layers (as described below with respect to block 530), the processor 13 may instead wait until the end of the method to provide a single signal for all of the layers. In one aspect, the processor 13 may signal the indication as a flag in a slice header, e.g., a flag set to a value of "0." In one aspect, the flag may be an HEVC-based flag, e.g., max_tid_ref_present_flag. In one aspect, the processor 13 may signal this indication to another device (e.g., the video decoder 30 of FIG. 3) that may use the indication to determine whether a variable is present and to perform further operations, as described in connection with FIG. 6. In one embodiment, the processor 13 may then proceed to block 530 where it may determine whether to process additional enhancement layers (e.g., the second enhancement layer 415A2) with respect to the first layer (e.g., first layer 410A). If the processor 13 determines to process additional enhancement layers with respect to the first layer, then the method 500 may return to block 510 and analyze the first layer (e.g., first layer 410A) with respect to the next second layer (e.g., second enhancement layer 415A2). If the processor 13 determines not to process additional second layers with respect to the first layer, then the method 500 ends at block 590. In the embodiment in which the processor 13 waits until the end of the method to signal one time for all of the separate layer associations (e.g., for each separate layer association of the first layer with each of the separate second layers) at once, the processor 13 may signal accordingly and then proceed to block 590.

If, at block 510, the processor 13 determines to perform inter-layer prediction analysis of the first layer with respect to the second layer (e.g., an enhancement layer) being considered, then at block 540, the processor 13 may signal that the inter-layer prediction analysis is performed for the first layer/second layer pair. In one exemplary embodiment, the processor 13 may instead wait until the end of the method to signal one time for all of the separate layer associations (e.g., for each separate layer association of the first layer with each of the separate second layers) at once. In one aspect, the processor 13 may signal the indication as a flag in a slice header, e.g., a flag set to a value of "1." In one aspect, the flag may be an HEVC-based flag, e.g., max_tid_ref_present_flag. In one aspect, the processor 13 may signal this indication to another device (e.g., the video decoder 30 of FIG. 3) that may use the indication to determine whether a variable is present and to perform further operations, as described in connection with FIG. 6.

At block 550, the processor 13 may determine whether the pictures of the first layer (e.g., the first pictures 430A1-430A5) can be used to inter-layer predict pictures of the second layer (e.g., first enhancement layer 415A1). In one aspect, the processor 13 may make this determination based on various properties of the pictures in the first layer, various properties of the pictures in the second layer, or any other number of factors. Some example factors may include: the enablement of light-weight single-loop coding and/or the reduction of coding complexity, the picture quality level of the first layer as compared to the picture quality level of the enhancement layer, etc. For example, if a picture in the first layer (e.g., first layer 410A) is different than a picture in the second layer by more than a threshold amount (e.g., based on a coarser quantization), then the processor 13 may determine that the picture in the first layer cannot be used to inter-layer predict the respective picture in the second layer (e.g., second enhancement layer 415A1).

If, at block 550, the processor 13 determines that the pictures of the first layer 410A will not be used to inter-layer predict pictures of the second layer, then at block 560, the processor 13 may set a variable to disable the use of the pictures of the first layer for inter-layer prediction of the pictures of the second layer. In one embodiment, the variable may comprise a first index value (e.g., [i]) and a second index value (e.g., [j]), where the first index value [i] is associated with and identifies the first layer (e.g., first layer 410A), and where the second index value [j] is associated with and identifies the second layer (e.g., first enhancement layer 415A1). In one embodiment, the variable may comprise an HEVC-based variable being set to "0," e.g., max_tid_il_ref_pics_plus1=0. In one example, the processor 13 may set a variable max_tid_il_ref_pics_plus1[0][1] equal to a value of "0" (e.g., to indicate that the Max TID associated with [i], [j] layer pair, where i corresponds to the first layer 410A, "Layer 0", when i=0, and where j corresponds to the first enhancement layer 415A1, "Layer 1", when j=1, is equal to a value of "0"). In this example, the variable max_tid_il_ref_pics_plus1[0][1]=0 may indicate that pictures in the first layer 410A are not used as reference for inter-layer prediction for pictures in the first enhancement layer 415A1. At block 580, the processor 13 may then signal this variable (e.g., in a slice header). Another device (e.g., the decoder 30) may use the variable to perform further operations, as described in connection with FIG. 6. In other words, the processor 13 may indicate whether pictures in the first layer 410A can or cannot be used to predict pictures in one enhancement layer (e.g., the first enhancement layer 415A1) without indicating whether pictures in the first layer 410A can or cannot be used to predict pictures in another enhancement layer (e.g., the second enhancement layer 415A2). That is, the processor 13 may separately indicate whether pictures in the first layer 410A can be used to predict pictures in the first enhancement layer 415A1 (which indication may not include any indication relating to the second enhancement layer 415A2) and then may separately indicate whether pictures in the first layer 410A can be used to predict pictures in the second enhancement layer 415A2 (which indication may not include any indication relating to the first enhancement layer 415A1). The processor 13 may then continue to block 530, as described above. In one embodiment, if the processor 13 processes multiple layers (as determined at block 530), the processor 13 may instead wait until the end of the method to signal one time for all of the separate layer associations (e.g., for each separate layer association of the first layer with each of the separate second layers) at once. For example, in one embodiment, if the processor 13 processes multiple layers, the processor 13 may wait until the end of the method to signal all of the separate layer association signals of one or more of blocks 520, 540, and/or 580 at once.

If, at block 550, the processor 13 determines that the pictures of the first layer may be used to inter-layer predict pictures of the second layer, then at block 570, the processor 13 may set a variable to enable the use of the pictures of the first layer for inter-layer prediction of the pictures of the second layer. In one embodiment, the variable may comprise a first index value (e.g., [i]) and a second index value (e.g., [j]), where the first index value [i] is associated with and identifies the first layer (e.g., first layer 410A), and where the second index value [j] is associated with and identifies the second layer (e.g., first enhancement layer 415A1). In one embodiment, the variable may comprise an HEVC-based variable, e.g., max_tid_il_ref_pics_plus1[i][j]. In one example, the processor 13 may set a variable max_tid_il_ref_pics_plus1[0][1] (where i corresponds to the first layer 410A, "Layer 0", when i=0, and where j corresponds to the first enhancement layer 415A1, "Layer 1", when j=1) to a value as further described below.

In one embodiment, the processor 13 may set the variable to an integer value (e.g., an integer value between "0" and "6"), which may represent a TID threshold value. As one example, it may be beneficial for the processor 13 to set the variable to an integer value representing a TID threshold value when each of the pictures (e.g., first layer pictures 430, and enhancement layer pictures 431, and 432) are associated with a particular TID value. In one embodiment, such setting may allow the processor 13 (or a different device) to determine that the pictures being associated with a particular TID value that is greater than the TID threshold value will not be used for inter-layer prediction (as further described below). In one embodiment, the variable's value may indicate that the first picture (e.g., the first picture 430 in the first layer 410A) can be used for inter-layer prediction of a second picture (e.g., a picture in the first enhancement layer 415A1) if the first picture is associated with a TID value less than the TID threshold value, as further described in connection with FIG. 6. To illustrate, the processor 13 may set the variable max_tid_il_ref_pics_plus1[0][1]=3, which would indicate a TID threshold value of "3" for the first layer pictures with respect to second layer pictures (the second enhancement layer pictures 431A). At block 580, the processor 13 may then signal this variable (e.g., in a slice header). A device (e.g., the decoder 30) may use the variable to perform further operations, as described in connection with FIG. 6. In other words, the processor 13 may indicate whether pictures in the first layer 410A can or cannot be used to predict pictures in one enhancement layer (e.g., the enhancement layer 415A1) without indicating whether pictures in the first layer 410A can or cannot be used to predict pictures in another enhancement layer (e.g., the enhancement layer 415A2). The processor 13 may then continue to block 530, as described above. In one embodiment, if the processor 13 processes multiple layers (as determined at block 530), the processor 13 may instead wait until the end of the method to signal one time for all of the separate layer associations (e.g., for each separate layer association of the first layer with each of the separate second layers) at once. For example, in one embodiment, if the processor 13 processes multiple layers, the processor 13 may wait until the end of the method to signal all of the separate layer association signals of one or more of blocks 520, 540, and/or 580 at once.

In another embodiment, the processor 13 may not set any value to the variable. In such embodiment, the variable may then be inferred to have a certain value (e.g., an integer value of "7"). As one example, it may be beneficial for the processor 13 to not set the variable to an integer value (e.g., inferring that the integer value is "7") when each of the pictures (e.g., first layer pictures 430, and enhancement layer pictures 431, and 432) are associated with a particular TID value and are each used for inter-layer prediction. In one embodiment, such setting may allow the processor 13 (or a different device) to determine that each of the pictures will be used for inter-layer prediction, for example, because each of the pictures are associated with a possible TID value (e.g., a TID value that is less than "7") as further described below. In one embodiment, the variable's value may indicate that the first picture (e.g., the first picture 430 in the first layer 410A) can be used for inter-layer prediction of a second picture (e.g., a picture in the first enhancement layer 415A1), as further described in connection with FIG. 6. At block 580, the processor 13 may then signal this variable (e.g., in a slice header). A device (e.g., the decoder 30) may use the variable to perform further operations, as described in connection with FIG. 6. The processor 13 may then continue to block 530, as described above. In one embodiment, if the processor 13 processes multiple layers (as determined at block 530), the processor 13 may instead wait until the end of the method to signal one time for all of the separate layer associations (e.g., for each separate layer association of the first layer with each of the separate second layers) at once. For example, in one embodiment, if the processor 13 processes multiple layers, the processor 13 may wait until the end of the method to signal all of the separate layer association signals of one or more of blocks 520, 540, and/or 580 at once.

Following Scenario A of FIG. 4 along with the method described in connection with FIG. 5, the processor 13 may determine to perform inter-layer prediction analysis for a first layer (e.g., the first layer 410A) with respect to a second layer (e.g., the enhancement layer 415A1) at block 510. The processor 13 may signal this at block 540, e.g. by setting and signaling the flag max_tid_ref_present_flag equal to 1. At block 550, the processor 13 may then determine that the pictures in the first layer can be used to inter-layer predict the pictures in the second layer. Thus, at block 570, the processor 13 may set a variable (e.g., the max_tid_il_ref_pics_plus1[i][j] variable) to enable the use of the first layer for inter-layer predicting the pictures of the second layer. In this example, the processor 13 may set the variable equal to a value of "2", such that pictures in the first layer 410A being associated with a TID value greater than or equal to a value of "2" may not be used for inter-layer predicting pictures in the enhancement layer 415A1 (as shown by the arrows with X's). Then at block 580, the processor 13 may signal the variable with reference to the first layer and the second layer 415A1. For example, in this case, the processor 13 may signal max_tid_il_ref_pics_plus1[0][1]=2. Then, at block 530 the processor 13 may determine to process additional enhancement layers (e.g., the enhancement layer 415A2) with respect to the first layer 410A, and then return to block 510. The processor 13 may then proceed similarly as described above, except that at block 570, the processor 13 may set the variable equal to some value greater than 2 (e.g., 3 through 6) or not set the value at all (e.g., implying a value of 7). Thus, since all of the pictures in the first layer 410A are associated with a TID value of 2 or below, all of the pictures in the first layer 410A may be used for inter-layer predicting pictures in the enhancement layer 415A2. Then at block 580, the processor 13 may signal the variable with reference to the first layer and the second layer. For example, in this case, the processor 13 may signal max_tid_il_ref_pics_plus1[0][2]=4. Then, at block 530 the processor 13 may determine not to process any additional enhancement layers with respect to the first layer 410A, and then end the method at block 590. In one embodiment, if the processor 13 processes multiple layers (as determined at block 530), the processor 13 may instead wait until the end of the method to signal one time for all of the separate layer associations (e.g., for each separate layer association of the first layer with each of the separate second layers) at once. For example, in one embodiment, if the processor 13 processes multiple layers, the processor 13 may wait until the end of the method to signal all of the separate layer association signals of one or more of blocks 520, 540, and/or 580 at once.

Following Scenario B of FIG. 4 along with the method described in connection with FIG. 5, the processor 13 may determine to perform inter-layer prediction analysis for the first layer 410B with respect to the enhancement layer 415B1 at block 510. The processor 13 may signal this at block 540, e.g. by setting and signaling the flag max_tid_ref_present_flag equal to a value of "1." In one embodiment, the processor 13 may wait to make such a signal until the end of the method as described above. At block 550, the processor 13 may then determine that the pictures in the first layer 410B can be used to inter-layer predict the pictures in the enhancement layer 415B1. Thus, at block 570, the processor 13 may set a variable (e.g., the max_tid_il_ref_pics_plus1[i][j] variable) to enable the use of the first layer 410B for inter-layer predicting the pictures of the enhancement layer 415B1. In this example, the processor 13 may set the variable equal to some value greater than "2" (e.g., "3" through "6") or not set the value at all (e.g., implying a value of 7). Thus, since all of the pictures in the first layer 410B are associated with a TID value of "2" or below, all of the pictures in the first layer 410B may be used for inter-layer predicting pictures in the enhancement layer 415B1. Then at block 580, the processor 13 may signal the variable with reference to the first layer 410B and the enhancement layer 415B1. For example, in this case, the processor 13 may signal max_tid_il_ref_pics_plus1[0][1]=5. Then, at block 530 the processor 13 may determine to process additional enhancement layers (e.g., the enhancement layer 415B2) with respect to the first layer 410B, and then return to block 510. The processor 13 may then proceed similarly as described above, except that at block 570, the processor 13 may set the variable equal to "1", such that pictures in the first layer 410B that are associated with a TID value greater than or equal to 1 may not be used for inter-layer predicting pictures in the enhancement layer 415B2 (as shown by the arrows with X's). Then at block 580, the processor 13 may signal the variable with reference to the first layer 410B and the enhancement layer 415B2. For example, in this case, the processor 13 may signal max_tid_il_ref_pics_plus1[0][2]=1. Then at block 530 the processor 13 may determine not to process any additional enhancement layers with respect to the first layer 410B, and then end the method at block 590. In one embodiment, if the processor 13 processes multiple layers (as determined at block 530), the processor 13 may instead wait until the end of the method to signal one time for all of the separate layer associations (e.g., for each separate layer association of the first layer with each of the separate second layers) at once. For example, in one embodiment, if the processor 13 processes multiple layers, the processor 13 may wait until the end of the method to signal all of the separate layer association signals of one or more of blocks 520, 540, and/or 580 at once.

As described above in connection with FIG. 4, the above processes are only examples of how the processor 13 and/or the video encoder 20 may make the described indications.

Figure 6:
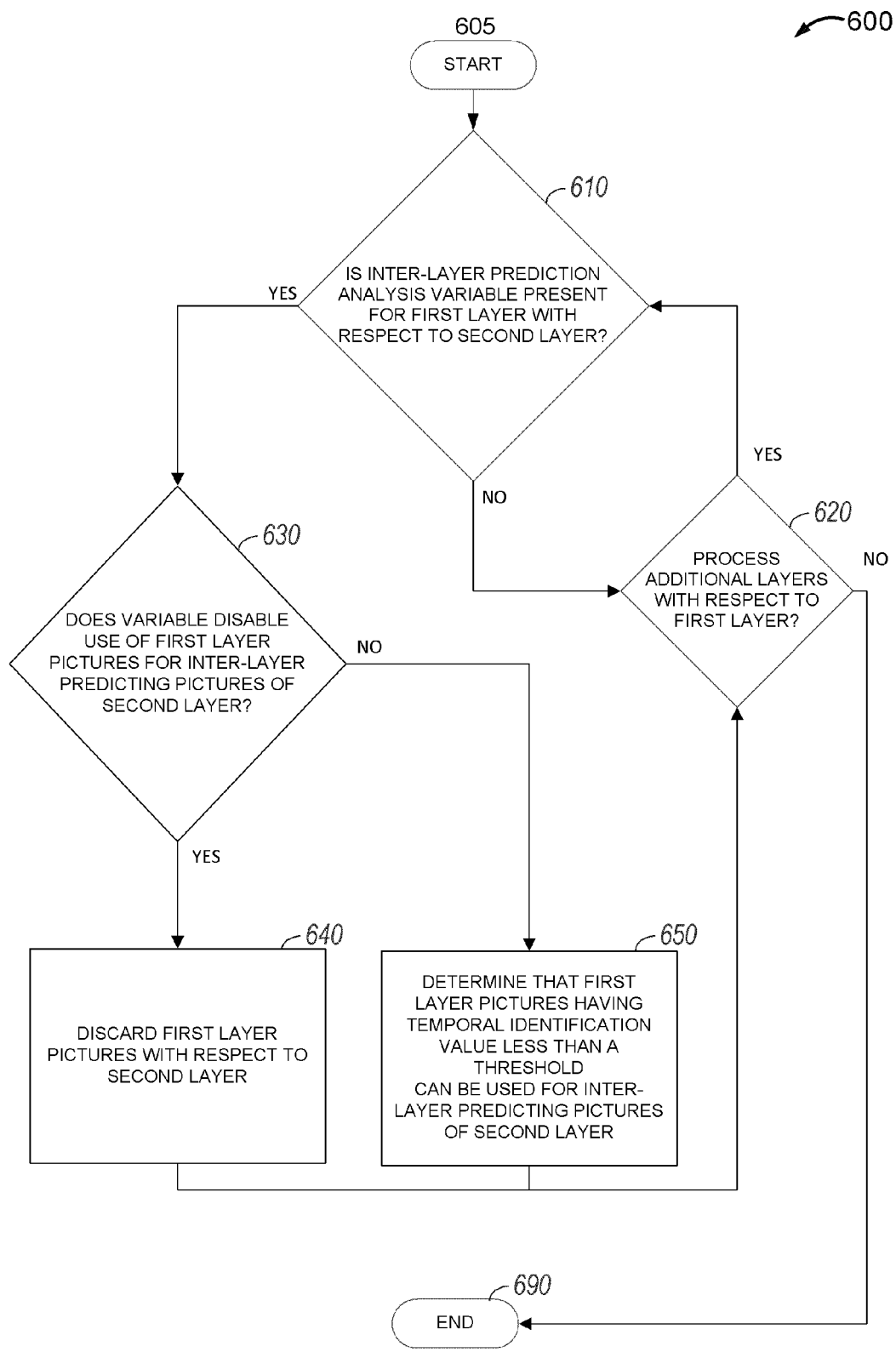
FIG. 6 illustrates a flowchart of one method for a processor of a video decoder to separately determine inter-layer prediction dependencies between a first layer and one or more second layers.

FIG. 6 illustrates a flowchart of one method for a processor (e.g., the processor 13) of a video decoder (e.g., the video encoder 30) to separately determine inter-layer prediction dependencies between a first layer (e.g., the first layer 410A of FIG. 4) and one or more second layers (e.g., the first and second enhancement layers 415A1 and 415A2 of FIG. 4), as described in connection with FIG. 4. For example, the processor 13 may separately determine (e.g., based on a respective indication), for each of the enhancement layers, whether the pictures in the first layer can be used for inter-layer prediction of an enhancement layer picture in a respective enhancement layer.

The method starts at block 605. At block 610, the processor 13 may determine whether an inter-layer prediction analysis variable (the "variable") is present for a first layer (e.g., the first layer 410A) with respect to a second layer (e.g., the enhancement layer 415A1). In one aspect, the processor 13 may make this determination based on a respective indication, which may have been signaled from a video encoder (e.g., the video encoder 20) as described in connection with FIGS. 4 and 5. In one aspect, the indication may be a flag signaled in a slice header. For example, the flag may be an HEVC-based flag, e.g., max_tid_ref_present_flag, as described in connection with FIG. 5.

At block 610, the processor 13 may determine that the variable is not set (e.g., max_tid_ref_present_flag is set to a value of "0"). In this case, the processor 13 may then proceed to block 620, where the processor 13 may determine whether to process additional enhancement layers (e.g., the second enhancement layer 415A2) with respect to the first layer. If the processor 13 determines to process additional enhancement layers with respect to the first layer 410A, then the method 600 may return to 610. However, at block 610, the processor will analyze a different second layer than it did previously (e.g., it will analyze the second enhancement layer 415A2). If the processor 13 determines not to process additional enhancement layers with respect to the first layer 410A, then the method ends at block 690.

Alternatively, at block 610, the processor 13 may determine that the variable is set (e.g., if max_tid_ref_present_flag is set to 1). In this case, the processor 13 may then proceed to block 630 and determine whether the variable disables the use of pictures in the first layer for inter-layer predicting pictures of the second layer (e.g., the first enhancement layer 415A1). For example, if as described in connection with FIG. 5, the variable comprises the HEVC-based variable max_tid_il_ref_pics_plus1 RIM, and the variable is set to a value of "0", then the processor 13 may determine that the variable disables the use of pictures in the first layer for inter-layer predicting pictures of the second layer (e.g., the first enhancement layer 415A1). Alternatively, as described in connection with FIG. 5, if the variable is not set to a value of "0" (e.g., if the variable is not set or if the variable is set to some non-zero value, such as a value of "1"), then the processor 13 may determine that the variable does not disable the use of pictures in the first layer 430A for inter-layer predicting pictures of the enhancement layer 415A1.

As described above, at block 630, the processor 13 may determine that the variable disables the use of pictures in the first layer for inter-layer predicting pictures of the second layer (e.g., first enhancement layer 415A1) (e.g., if max_tid_il_ref_pics_plus1[0][1]=0). In other words, the processor 13 may determine that pictures in the first layer can or cannot be used to predict pictures in one enhancement layer (e.g., the enhancement layer 415A1) without determining whether pictures in the first layer 410A can or cannot be used to predict pictures in another enhancement layer (e.g., the enhancement layer 415A2). In this case, the processor 13 may then proceed to block 640, where it may discard (e.g., remove from a buffer) the pictures in the first layer with respect to the second layer. For example, the processor 13 may discard the pictures in the first layer that are disabled for use for inter-layer prediction with respect to the second layer. As described above, discarding the associated first layer pictures may save memory and processing costs during inter-layer prediction of the second layer. For example, as described above, such a configuration may allow for the flexibility to implement lightweight decoding (e.g., single loop decoding) for an enhancement layer, while maintaining the flexibility to implement high-quality decoding (e.g., multi-loop decoding) for one or more of the other enhancement layers (e.g., the enhancement layer 415A2).

Alternatively, as described above, at block 630, the processor 13 may determine that the variable does not disable the use of pictures in the first layer for inter-layer predicting pictures of the second layer (e.g., if max_tid_il_ref_pics_plus1[0][1]≠0). In this case, the processor 13 may then proceed to block 650, where it may determine that pictures in the first layer that are associated with a TID value less than a threshold (e.g., a TID threshold value) can be used for inter-layer predicting pictures of the second layer (e.g., first enhancement layer 415A1). For example, the processor 13 may determine that pictures in the first layer 410A can or cannot be used to predict pictures in one enhancement layer (e.g., the enhancement layer 415A1) without determining whether pictures in the first layer 410A can or cannot be used to predict pictures in another enhancement layer (e.g., the enhancement layer 415A2). As described in connection with FIG. 4, although some of the first pictures 430 may not be restricted from being used for inter-layer predicting their respective enhancement pictures 431 or 432, the processor 13 may nonetheless determine not to actually use one or more of the non-restricted pictures for inter-layer prediction. For example, the processor 13 may make this determination based on information in the slice header.

In one embodiment, the variable may be set to an integer value (e.g., an integer value between "0" and "6"), which may represent a TID threshold value (e.g., the TID threshold value described in connection with block 650). In one embodiment, the variable's value may indicate that the first picture (e.g., the first picture 430 in the first layer 410A) can be used for inter-layer prediction of a second picture (e.g., a picture in the first enhancement layer 415A1) if the first picture is associated with a TID value less than the TID threshold value, as further described in connection with FIG. 6. To illustrate, the processor 13 may set the variable max_tid_il_ref_pics_plus1[0][1]=3, which would indicate a TID threshold value of "3" for the first layer pictures with respect to second layer pictures (the second enhancement layer pictures 431A).

In another embodiment, the variable may not be set to any value. As described in connection with FIG. 5, in this case, the variable may then be inferred to have a certain value (e.g., an integer value of "7"). As described above, in one embodiment, such setting may allow the processor 13 (at block 650) to determine that each of the pictures will be used for inter-layer prediction, for example, because each of the pictures are associated with a possible TID value (e.g., a TID value that is less than "7").

Following either of block 640 or block 650, the processor 13 may then continue to block 620 where the processor 13 will either repeat the process with an additional second layer (at block 610) or end the method (at block 690) as described above. In one embodiment, when the method ends, the video decoder 30 may then proceed to decode one or more of the enhancement pictures (e.g., the enhancement pictures 431 and/or 432) using inter-layer prediction based on one or more of the associated current pictures (e.g., the current pictures 430). In one aspect, the one or more associated current pictures may be associated with a TID value that is less than a TID threshold value associated with the current picture and the enhancement layer picture.

Following Scenario A of FIG. 4 along with the method described in connection with FIG. 6, the processor 13 may determine that the variable is present for a first layer (e.g., the first layer 410A) with respect to a second layer (e.g., the enhancement layer 415A1). For example, the processor 13 may determine that max_tid_ref_present_flag is set to 1. The processor 13 may then proceed to block 630 and determine that the variable does not disable the use of pictures in the first player for inter-layer predicting pictures of the second layer. For example, the processor 13 may make such determination based on determining that max_tid_il_ref_pics_plus1[0][1]≠0. Thus, the processor 13 may then proceed to block 650 and determine that the pictures in the first layer being associated with a TID value less than a TID threshold value (e.g., which TID threshold value may be based on the value of max_tid_il_ref_pics_plus1[0][1], if any) can be used for inter-layer predicting pictures of the second layer.

In the illustrated example of Scenario A, the variable may be set to "2" (e.g., max_tid_il_ref_pics_plus1[0][1]=2), such that the processor 13 may determine that pictures in the first layer (e.g., first layer 410A) being associated with a TID value greater than or equal to "2" may not be used for inter-layer predicting pictures in the second layer (e.g., enhancement layer 415A1), as shown by arrows with X's. Then, at block 620 the processor 13 may determine to process an additional second layer (e.g., the enhancement layer 415A2) with respect to the first layer, and then return to block 610. The processor 13 may then proceed similarly as described above, except that at block 650, the variable may be set to some value greater than "2" (e.g., a value of "3" through "6") or the variable may not be set at all (e.g., implying a value of "7"). For example, in the illustrated example of Scenario A, the variable max_tid_il_ref_pics_plus1[0][2] may be set to "4". Thus, since all of the pictures in the first layer (e.g., first layer 410A) are associated with a TID value of "4" or below, the processor 13 may determine that all of the pictures in the first layer may be used for inter-layer predicting pictures in the second layer (e.g., enhancement layer 415A2). Then, at block 620, the processor 13 may determine not to process any additional layers with respect to the first layer, and then end the method at block 690. In one embodiment, when the method ends, the video decoder 30 may then proceed to decode one or more of the enhancement pictures (e.g., enhancement pictures 431A and/or 432A) using inter-layer prediction based on one or more of the associated current pictures (e.g., current pictures 430A). In one aspect, the one or more associated current pictures may be associated with a TID value less than a TID threshold value associated with the current picture and the enhancement layer picture.

Following Scenario B of FIG. 4 along with the method described in connection with FIG. 6, the processor 13 may determine that the variable is present for a first layer (e.g., the first layer 410B) with respect to a second layer (e.g., the enhancement layer 415B1). For example, the processor 13 may determine that max_tid_ref_present_flag is set to 1. The processor 13 may then proceed to block 630 and determine that the variable does not disable the use of pictures in the first player for inter-layer predicting pictures of the second layer. For example, the processor 13 may make such determination based on determining that max_tid_il_ref_pics_plus1[0][1]≠0. Thus, the processor 13 may then proceed to block 650 and determine that the pictures in the first layer being associated with a TID value less than a TID threshold value (e.g., which TID threshold value may be based on the value of max_tid_il_ref_pics_plus1[0][1], if any) can be used for inter-layer predicting pictures of the second layer. In the illustrated example of Scenario B, the variable may be set to some value greater than "2" (e.g., a value of "3" through "6") or the variable may not be set at all (e.g., implying a value of "7"). For example, in the illustrated example of Scenario B, the variable max_tid_il_ref_pics_plus1[0][2] may be set to "5". Thus, since all of the pictures in the first layer (e.g., first layer 410B) are associated with a TID value of "5" or below, the processor 13 may determine that all of the pictures in the first layer may be used for inter-layer predicting pictures in the second layer (e.g., enhancement layer 415B2). Then, at block 620 the processor 13 may determine to process an additional second layer (e.g., the enhancement layer 415B2) with respect to the first layer, and then return to block 610. The processor 13 may then proceed similarly as described above, except that at block 650, the variable may be set to a value of "1" (e.g., max_tid_il_ref_pics_plus1[0][2]=1), such that the processor 13 may determine that pictures in the first layer (e.g., first layer 410B) being associated with a TID value greater than or equal to "1" may not be used for inter-layer predicting pictures in the second layer (e.g., enhancement layer 415B1), as shown by arrows with X's. Then, at block 620, the processor 13 may determine not to process any additional layers with respect to the first layer, and then end the method at block 690. In one embodiment, when the method ends, the video decoder 30 may then proceed to decode one or more of the enhancement pictures (e.g., enhancement pictures 431B and/or 432B) using inter-layer prediction based on one or more of the associated current pictures (e.g., current pictures 430B). In one aspect, the one or more associated current pictures may be associated with a TID value less than a TID threshold value associated with the current picture and the enhancement layer picture.

As described above in connection with FIGS. 4 and 5, the above processes are only examples of how the processor 13 and/or the video decoder 30 may make the described determinations.

Figure 7:
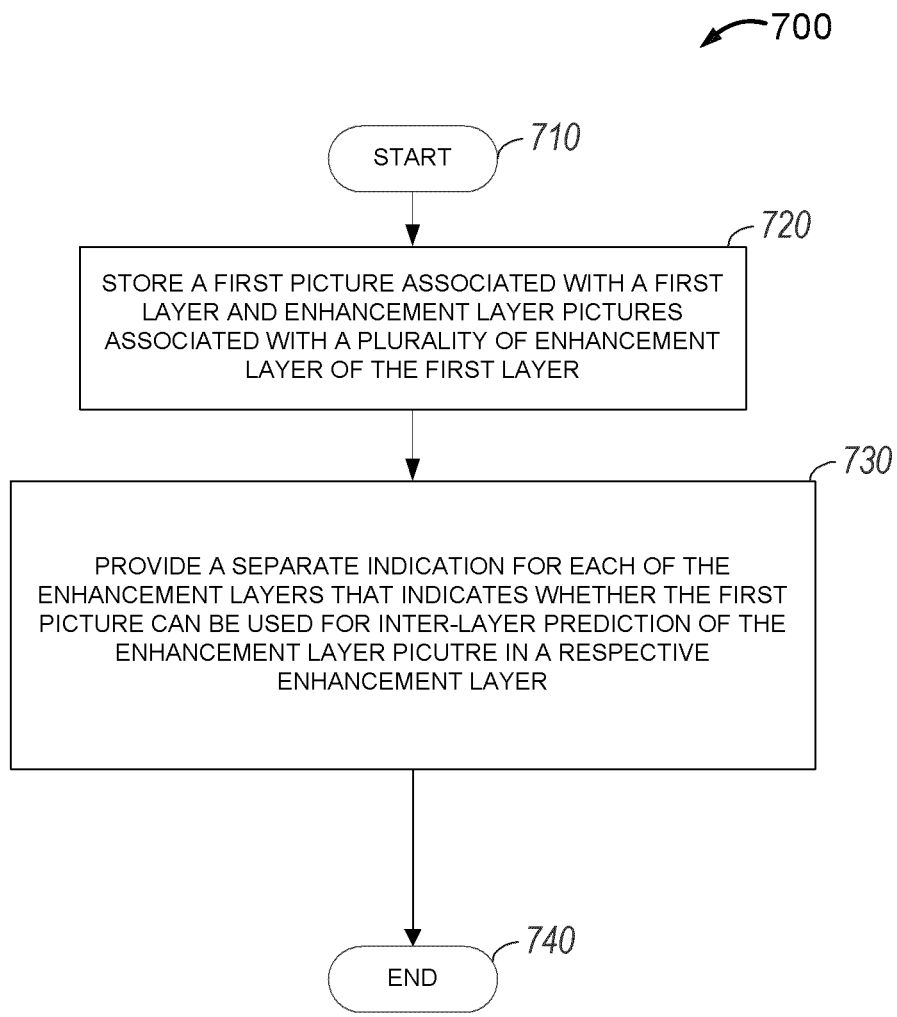
FIG. 7 illustrates another embodiment of a method of encoding video information.

Another embodiment of a method of encoding video information is illustrated in FIG. 7. The method 700 begins at block 710. At block 710, a processor (e.g., any processor described herein) stores a first picture associated with a first layer. The processor also stores enhancement layer pictures associated with a plurality of enhancement layers of the first layer. For example, in one embodiment, the first layer corresponds to first layer 410A, described above, and the plurality of enhancement layers corresponds to first and second enhancement layers, 415A1 and 415A2, described above.

At block 730, the processor provides a separate indication for each of the enhancement layers. The indication indicates whether the first picture can be used for inter-layer prediction of the enhancement layer picture in a respective enhancement layer. For example, the processor may provide a Max TID value for each first layer-to-enhancement layer pair, as described above. In one embodiment, the processor provides a Max TID value in a variable having an [i] index (where [i] indicates the first layer's Layer ID value) and a [j] index (where [j] indicates each enhancement layer's Layer ID value). The method 700 therefore provides the processor the ability to specify different Max TID values for each enhancement layer of the current layer. The method 700 ends at block 740.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A video encoder comprising:
    a memory unit configured to store pictures associated with a first layer[i] and enhancement layer pictures associated with a plurality of enhancement layers; and
    a processor in communication with the memory unit and configured to assign a value to a variable max_tid_il_ref_pics_plus1[i][j] associated with each combination of the first layer[i] with a particular enhancement layer[j] among the plurality of enhancement layers, wherein for each of the plurality of enhancement layers, the pictures associated with the first layer[i] having a temporal identification value less than or equal to the value of the variable max_tid_il_ref_pics_plus1[i][j] associated with the particular enhancement layer[j] can be used for inter-layer prediction of the enhancement layer pictures associated with the particular enhancement layer[j].

2. The video encoder of claim 1, wherein the processor is further configured to:
    signal a max_tid_ref_present_flag in the video parameter set(VPS) extension based on presence or absence of the variable max_tid_il_ref_pics_plus1[i][j].

3. The video encoder of claim 1, wherein the processor is configured to assign the variable max_tid_il_ref_pics_plus1[i][j] a value of 0 based on the pictures associated with the first layer[i] not being used for inter-layer prediction of pictures associated with the particular enhancement layer[j].

4. The video encoder of claim 2, wherein the processor is configured to set the max_tid_ref_present_flag to 0 and not signal the variable max_tid_il_ref_pics_plus1[i][j] based on all the pictures associated with the first layer[i] being used for inter-layer prediction of pictures associated with the particular enhancement layer[j].

5. A method of encoding video, the method comprising:
    storing pictures associated with a first layer[i] and enhancement layer pictures associated with a plurality of enhancement layers; and
    assigning a value to a variable max_tid_il_ref_pics_plus1[i][j] associated with each combination of the first layer[i] with a particular enhancement layer[j] among the plurality of enhancement layers, wherein for each of the plurality of enhancement layers, the pictures associated with the first layer[i] having a temporal identification value less than or equal to the value of the variable max_tid_il_ref_pics_plus1 [i][j] associated with the particular enhancement layer[j] can be used for inter-layer prediction of the enhancement layer pictures associated with the particular enhancement layer[j].

6. The method of claim 5, further comprising:
    signaling a max_tid_ref_present_flag in the video parameter set (VPS) extension based on presence or absence of the variable max_tid_il_ref_pics_plus1[i][j].

7. The method of claim 5, further comprising assigning the variable max_tid_il_ref_pics_plus1[i][j] a value of 0 based on the pictures associated with the first layer[i] not being used for inter-layer prediction of pictures associated with the particular enhancement layer[j].

8. The method of claim 6, further comprising setting the max_tid_ref_present_flag to 0 and not signaling the variable max_tid_il_ref_pics_plus1[i][j] based on all the pictures associated with the first layer[i] being used for inter-layer prediction of pictures associated with the particular enhancement layer[j].

9. A video decoder comprising:
    a memory unit configured to store pictures associated with a first layer[i] and enhancement pictures associated with a plurality of enhancement layers; and
    a processor in communication with the memory unit and configured to determine that pictures associated with the first layer[i] can be used for inter-layer prediction of a particular enhancement layer[j] among the plurality of enhancement layers based on pictures associated with the first layer[i] having a temporal identification value less than or equal to a value of the variable max_tid_il_ref_pics_plus1[i][j] associated with each combination of the first layer[i] and the particular enhancement layer[j].

10. The video decoder of claim 9, wherein the processor is further configured to receive a max_tid_ref_present_flag in the video parameter set (VPS) extension based on presence or absence of the variable max_tid_il_ref_pics_plus1 [i][j].

11. The video decoder of claim 9, wherein the processor is configured to discard the pictures associated with the first layer[i] based on a value of the variable max_tid_il_ref_pics_plus1[i][j] being 0.

12. The video decoder of claim 10, wherein the processor is configured to determine that all pictures associated with the first layer[i] can be used for interlayer prediction of pictures associated with the particular enhancement layer[j] based on the max_tid_ref_present_flag having a value 0, the processor further configured to assign the variable max_tid_il_ref_pics_plus1[i][j] a value of 7.

13. A method of decoding video, the method comprising:
    storing pictures associated with a first layer[i] and enhancement layer pictures associated with a plurality of enhancement layers; and
    determining that pictures associated with the first layer[i] can be used for inter-layer prediction of a particular enhancement layer[j] among the plurality of enhancement layers based on pictures associated with the first layer[i] having a temporal identification value less than or equal to a value of the variable max_tid_il_ref_pics_plus1[i][j] associated with each combination of the first layer[i] and the particular enhancement layer[j].

14. The method of claim 13, further comprising discarding pictures associated with the first layer[i] based on a value of the variable max_tid_il_ref_pics_plus1[i][j] being 0.

15. The method of claim 13, further comprising determining that all pictures associated with the first layer[i] can be used for interlayer prediction of pictures associated with the particular enhancement layer[j] based on receiving a max_tid_ref_present_flag having a value 0 and assigning the variable max_tid_il_ref_pics_plus1[i][j] a value of 7.

* * * * *